(12) United States Patent
Minemura et al.

(10) Patent No.: US 11,561,393 B2
(45) Date of Patent: Jan. 24, 2023

(54) LIGHT GUIDE PLATE AND IMAGE DISPLAY DEVICE

(71) Applicant: Hitachi-LG Data Storage, Inc., Tokyo (JP)

(72) Inventors: Hiroyuki Minemura, Tokyo (JP); Yumiko Anzai, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 570 days.

(21) Appl. No.: 16/575,542

(22) Filed: Sep. 19, 2019

(65) Prior Publication Data
US 2020/0150430 A1   May 14, 2020

(30) Foreign Application Priority Data
Nov. 14, 2018   (JP) .............................. JP2018-213865

(51) Int. Cl.
*G02B 27/01* (2006.01)
*F21V 8/00* (2006.01)

(52) U.S. Cl.
CPC ....... *G02B 27/0101* (2013.01); *G02B 6/0016* (2013.01); *G02B 6/0088* (2013.01); *G02B 27/0172* (2013.01); *G02B 2027/0178* (2013.01)

(58) Field of Classification Search
CPC ...... G02B 27/01; G02B 27/0103; G02B 5/32; G02B 30/40; G02B 30/50; G02B 30/56; G02B 27/0101; G02B 2027/0118; G02B 2027/014; G02B 2027/0156; G02B 27/0172; G02B 13/22; G02B 2027/0174;
(Continued)

(56) References Cited

U.S. PATENT DOCUMENTS 6,580,529 B1    6/2003  Amitai et al.
2006/0126181 A1  6/2006  Levola
(Continued)

FOREIGN PATENT DOCUMENTS

CN  101688977 A  3/2010
JP  2007-94175 A  4/2007
(Continued)

OTHER PUBLICATIONS

Chinese Office Action received in corresponding Chinese Application No. 201910963143.5 dated Sep. 7, 2021.
(Continued)

*Primary Examiner* — Collin X Beatty
*Assistant Examiner* — Grant A Gagnon
(74) *Attorney, Agent, or Firm* — Mattingly & Malur, PC

(57) ABSTRACT

To improve brightness of an image to be perceived by a user and enhance visibility there is provided a light guide plate including an incident diffraction grating which diffracts incident imaging light, an exit diffraction grating through which the imaging light goes out, and an intermediate diffraction grating existing in optical paths from the incident diffraction grating to the exit diffraction grating. In this light guide plate, a periodic linear corrugated pattern is formed as the incident diffraction grating, and when an imaginary line is established that passes through an incident point of imaging light onto the incident diffraction grating and is parallel with a periodic direction of the corrugated pattern, the intermediate diffraction grating has a first region on one side of the imaginary line and a second region on another side of the imaginary line.

10 Claims, 19 Drawing Sheets

(58) Field of Classification Search
CPC ........ G02B 2027/0178; G02B 27/1093; G02B 6/00; G02B 17/08; G02B 17/0816; G02B 17/086; G02B 2027/012; G02B 2027/0123; G02B 2027/0132; G02B 2027/0138; G02B 2027/0141; G02B 2027/0165; G02B 2027/0181; G02B 26/10; G02B 27/0149; G02B 27/017; G02B 27/1086; G02B 3/0087; G02B 5/02; G02B 5/0252; G02B 5/0257; G02B 5/0284; G02B 5/1819; G02B 5/1866; G02B 5/203; G02B 6/266; G02B 27/00
USPC .......................................................... 359/13
See application file for complete search history.

(56) References Cited

U.S. PATENT DOCUMENTS

| 2007/0070504 | A1 | 3/2007 | Akutsu et al. |
| 2010/0214659 | A1 | 8/2010 | Levola |
| 2013/0250380 | A1 | 9/2013 | Fujikawa et al. |
| 2016/0231566 | A1 | 8/2016 | Levola et al. |
| 2016/0327705 | A1 | 11/2016 | Simmonds et al. |
| 2018/0210205 | A1 | 7/2018 | Grey et al. |
| 2020/0041793 | A1 | 2/2020 | Kadono et al. |

FOREIGN PATENT DOCUMENTS

| JP | 2008-523435 | A | 7/2008 |
| JP | 2013-200467 | A | 10/2013 |
| JP | 2017-502348 | A | 1/2017 |
| JP | 2017-528739 | A | 9/2017 |
| WO | 99/52002 | A1 | 10/1999 |
| WO | 2008/148927 | A1 | 12/2008 |
| WO | 2017/120320 | A1 | 7/2017 |
| WO | 2017/222808 | A1 | 12/2017 |
| WO | 2018/070094 | A1 | 4/2018 |

OTHER PUBLICATIONS

Notice of Reasons for Refusal dated Feb. 8, 2022 issued in corresponding Japanese Patent Application No. 2018-213865.

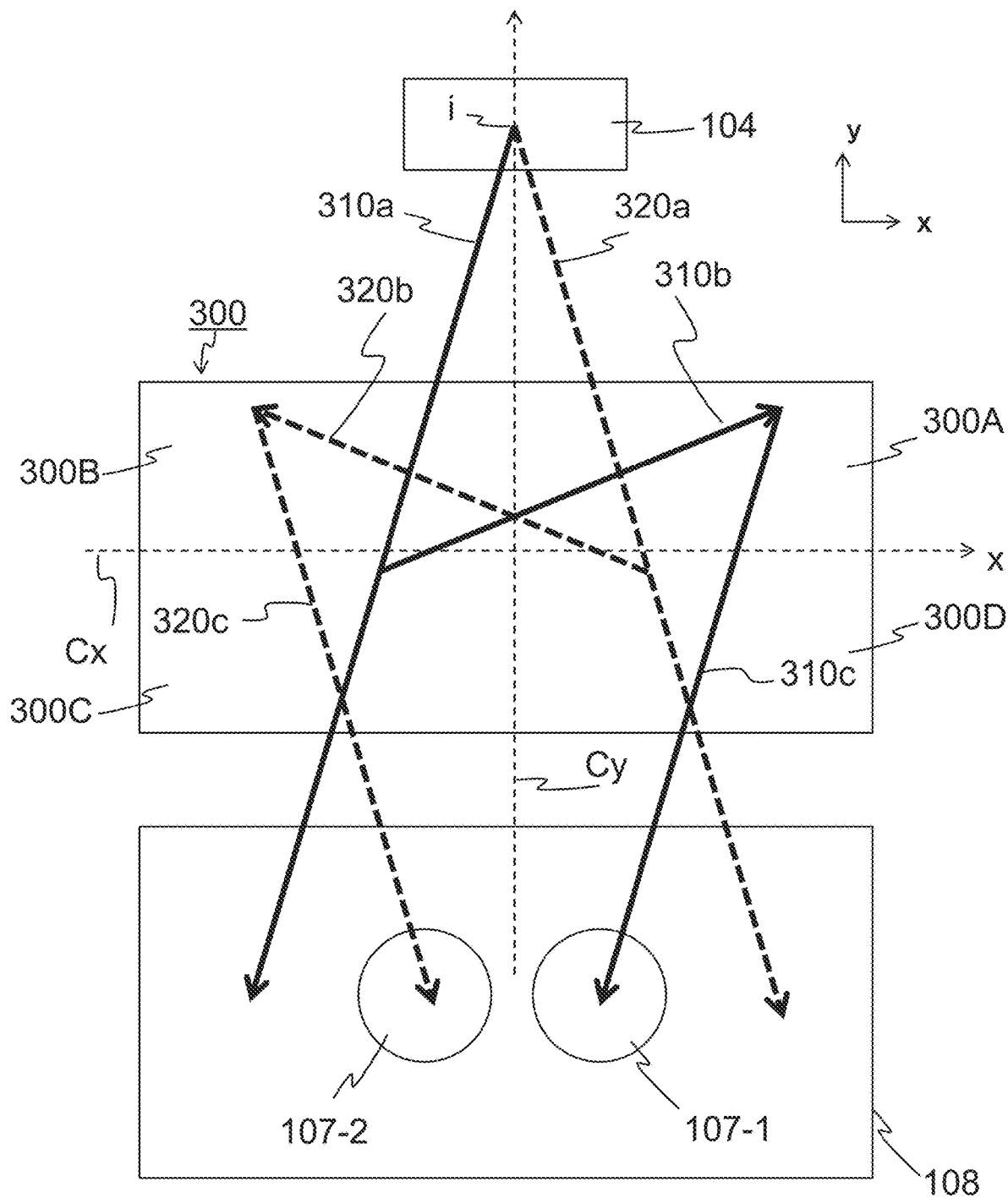

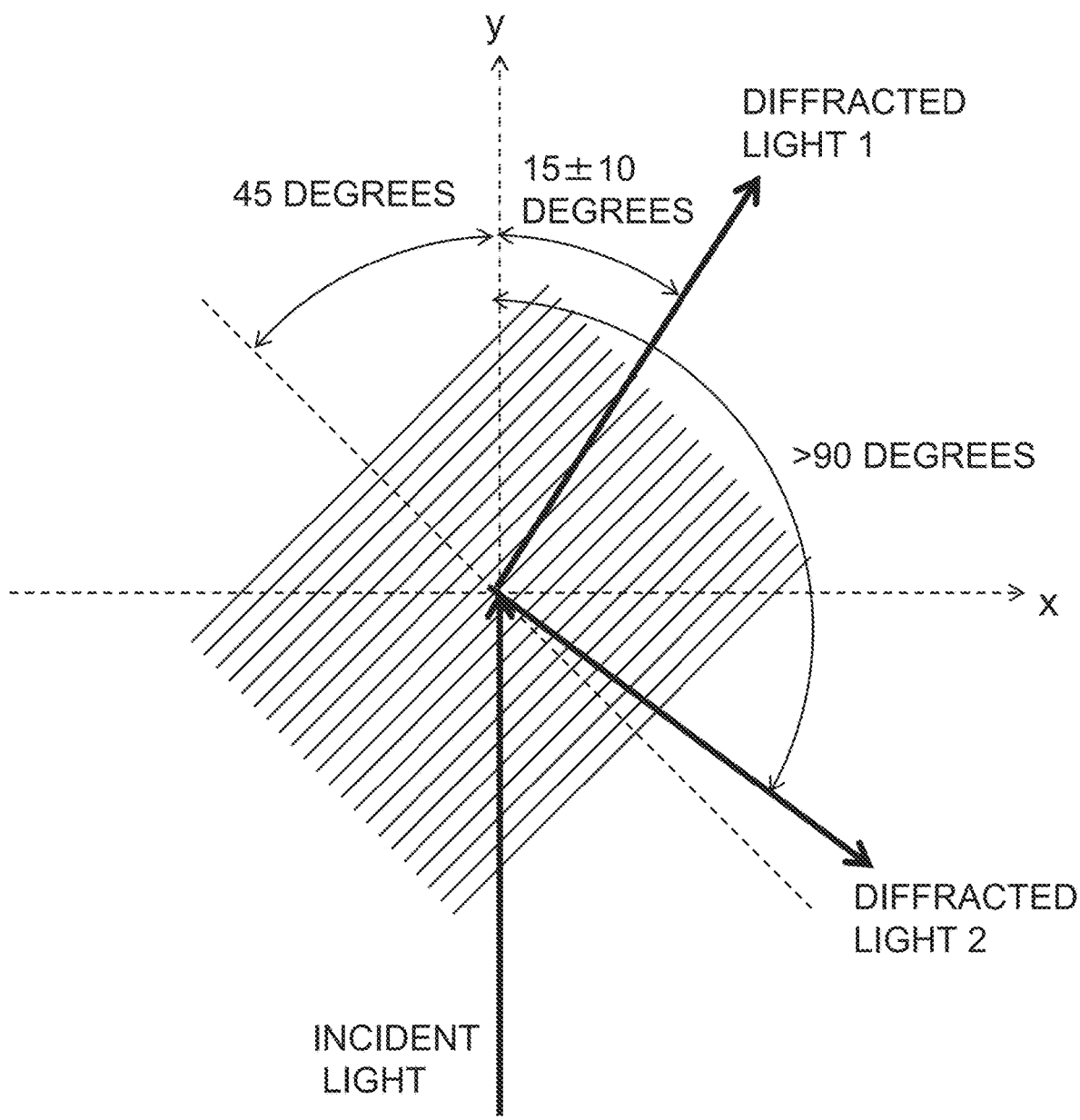

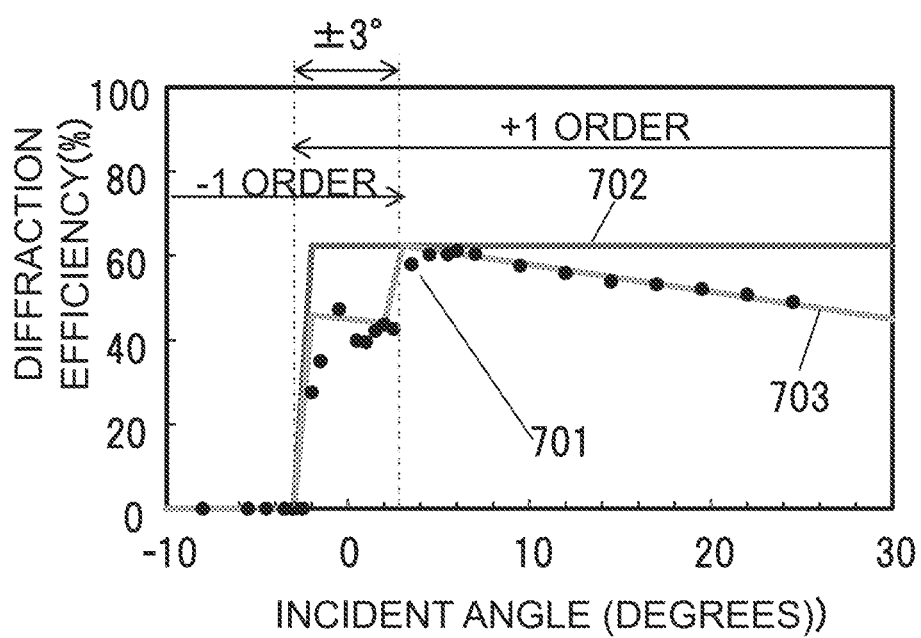

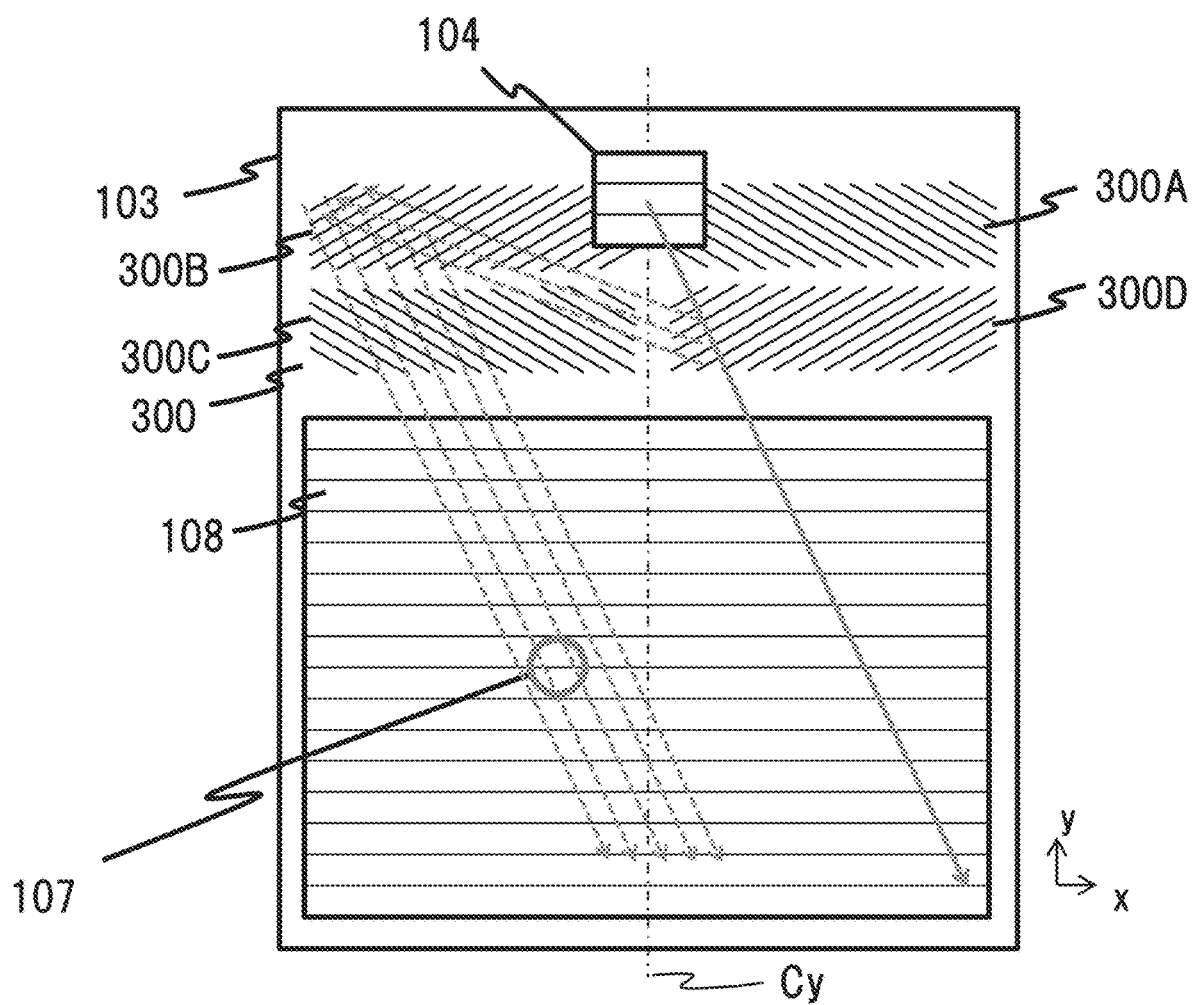

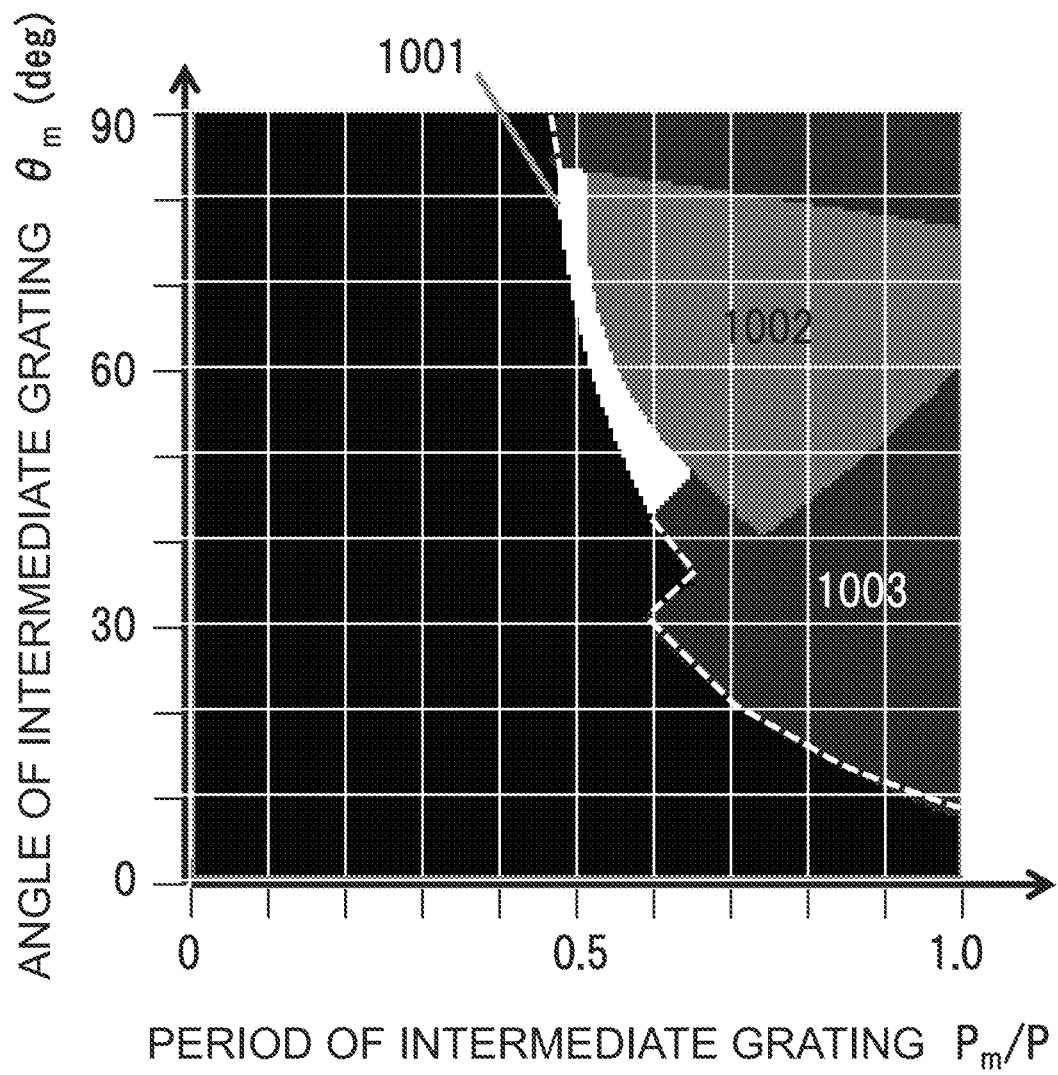

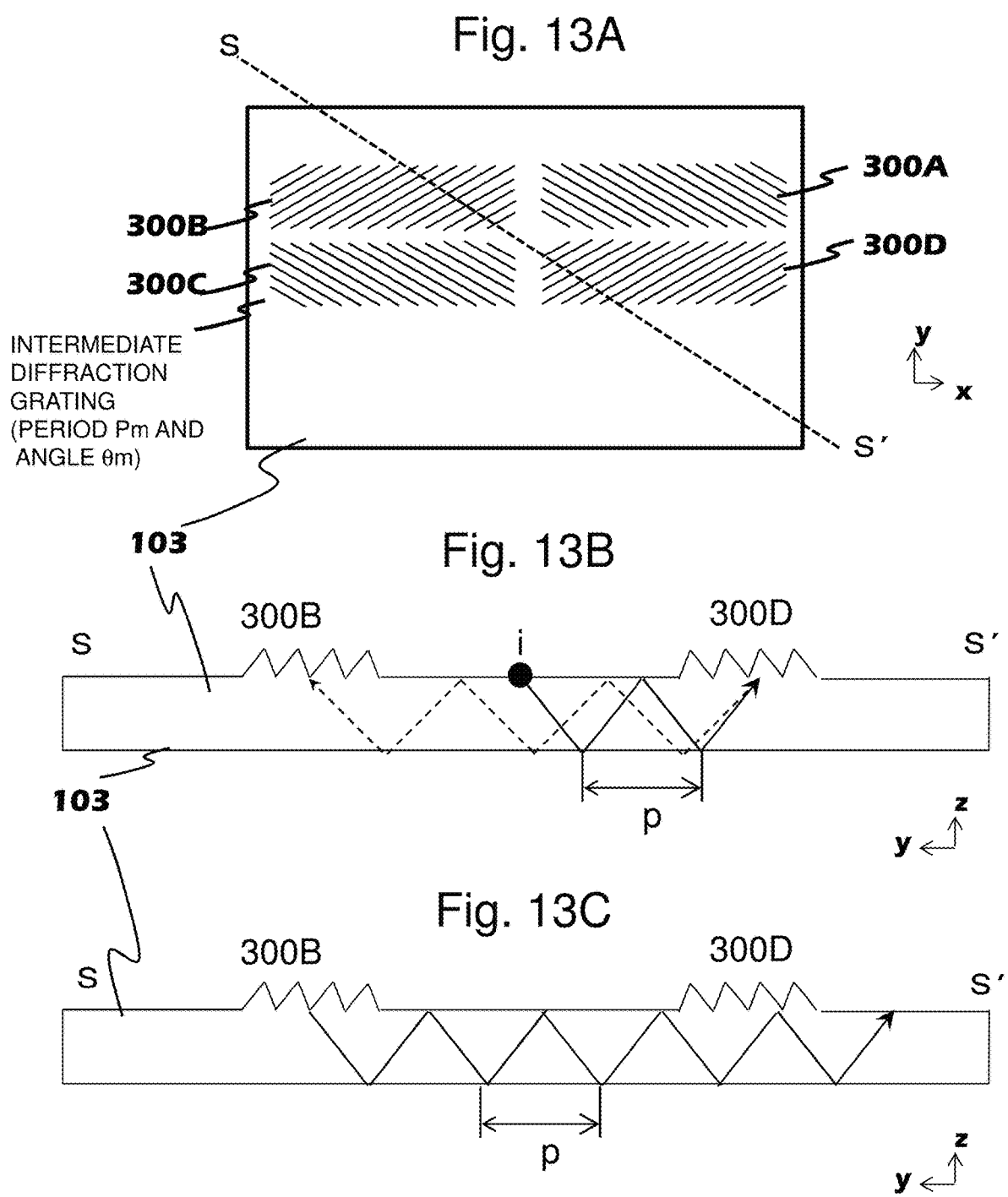

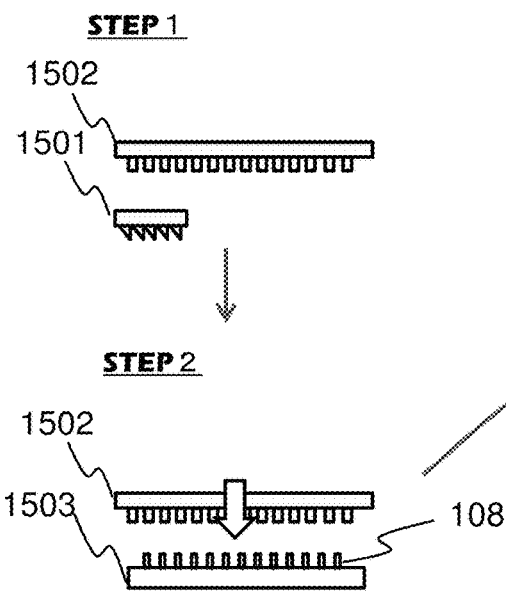
Fig. 15A
Fig.15B
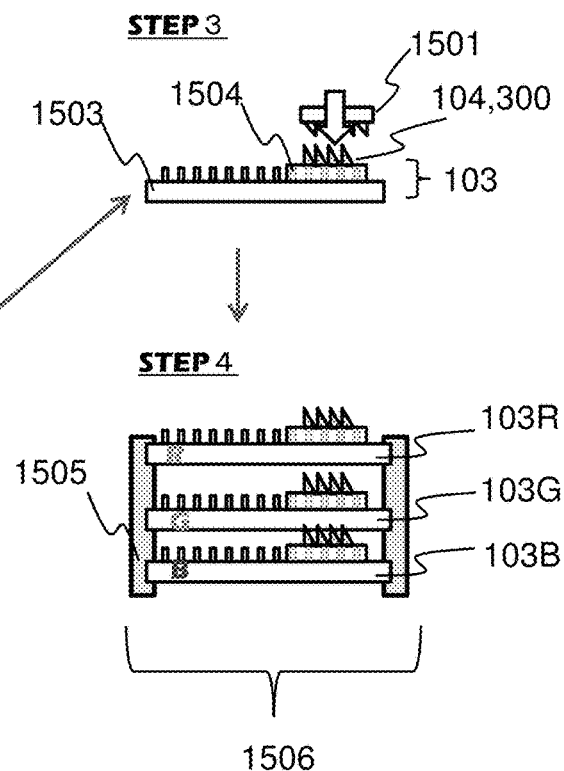
Fig. 15C
Fig. 15D

LIGHT GUIDE PLATE AND IMAGE DISPLAY DEVICE

CROSS-REFERENCE TO RELATED APPLICATION

The present application claims priority from Japanese application JP2018-213865, filed on Nov. 14, 2018, the contents of which is hereby incorporated by reference into this application.

BACKGROUND

The present invention relates to a light guide plate and an image display device with a light guide plate combined with diffraction elements, the display device being of small size and light weight and capable of displaying augmented reality images.

An augmented reality image display device allows a user to view not only a projected image, also have a surrounding view at the same time. The projected image can be superimposed on a real world that is perceived by the user. Other applications of such display include video games and wearable devices like eyeglasses among others. By wearing an image display device in the form of eyeglasses or goggles with a translucent light guide plate and a projector assembled together in them, the user can visualize an image that is supplied from the projector, superimposed on a real world.

Versions of image display devices of this kind are described in Japanese Unexamined Patent Application Publication (Translation of PCT Application) No. 2017-528739, U.S. Patent Publication 2016/0231566A1, and Published PCT International Application WO99/52002. In these patent literatures, a light guide plate is comprised of plural diffraction gratings with a periodic corrugated structure formed on a substrate made of glass. Light emitted from a projector is coupled into a light guide plate by an incident diffraction grating and propagates while being reflected totally internally in the light guide plate. The light is further converted into several light beams replicated by another diffraction grating and the beams propagate, reflected totally internally in the light guide plate, and finally go out of the light guide plate. A subset of the outgoing beams converges into an image on the retina through the pupil of the user and such image is perceived as an augmented reality image superimposed on a real world.

In the case of a light guide plate using such a corrugated type diffraction grating, a wavenumber vector K of light emitted from the projector becomes K0 when the light is refracted upon entering the light guide plate according to Snell's law. By the incident diffraction grating, the wavenumber vector of the light is further converted to a wavenumber vector K1 that allows for total reflection of the light internally in the light guide plate. When the light is diffracted through one or more other diffraction gratings provided in the light guide plate, the wavenumber vector changes, such as K2, K3, and so on, each time the light is refracted repeatedly. Assuming the wavenumber vector of light beams finally outgoing from the light guide plate is K', |K'|=|K|, where K'=K if the projector is present on the opposite side to the eyes across the light guide plate. On the other hand, if the projector is present on the same side as the eyes across the light guide plate, the light guide plate acts like a reflective mirror with regard to wavenumber vectors. Assuming that a normal vector of the light guide plate corresponds to a z direction, comparison of wavenumber vector components x, y, and z can be expressed as Kx'=Kx, Ky'=Ky, Kz'=−Kz.

A light guide plate functions to guide light waves while replicating light emitted from the projector into several beams so that plural outgoing beams will be perceived by a user as image information equivalent to an original image. The thus replicated beams in a set spread spatially, having wavenumber vectors equivalent to light having image information emitted from the projector. A subset of the replicated beams in a set enters the pupil and converges into an image on the retina, thus being visualized together with outside world's information, and it is thus possible to provide information based on augmented reality in addition to outside world's information to the user.

Light having image information varies in wavenumber vector magnitude depending on its wavelength. Because a corrugated type diffraction grating has a constant wavenumber vector, a diffracted wavenumber vector K1 differs depending on the wavelength of an incident light beam and light propagates at a differing angle through the light guide plate. A refraction index of a glass substrate that makes up the light guide plate is approximately constant relative to wavelength and a range of conditions for guiding light waves while reflecting them totally differs depending on the wavelength of an incident light beam. Hence, to allow a user to perceive an image at wide viewing angle, it is required to put multiple light guide plates which differ per wavelength one on top of the other. Generally, as for the number of light guide plates, three plates, corresponding to R, G, and B, respectively, or a range of two to four plates, one more or less than the mentioned number, is considered adequate.

An image display device that is described in Japanese Unexamined Patent Application Publication (Translation of PCT Application) No. 2017-528739 is an image display device for enlarging input light within two dimensions and this device is equipped with three linear diffraction gratings. One of them is an incident diffraction grating and other two diffraction gratings are representatively placed on the upper and rear surfaces of a light guide plate, overlapping one another, and function as a replicating grating and an exit grating.

In an image display device that is described in U.S. Patent Publication 2016/0231566A1 and Published PCT International Application WO99/52002, three diffracting gratings serving as an incoupling grating, a deflecting grating, and an exit grating are placed in a light guide plate within which their areas do not overlap one another. U.S. Patent Publication 2016/0231566A1 discloses a diffraction grating with an overhang structure to increase the diffraction efficiency of an incident diffraction grating.

Japanese Unexamined Patent Application Publication No. 2007-94175 and Japanese Unexamined Patent Application Publication No. 2013-200467 disclose a technology that uses two incoupling and exit holograms which are of a reflective volume type as diffraction gratings which are formed in a light guide plate. Hereon, these volume type holograms include multiple diffraction gratings respectively dedicated for multiple wavelengths, formed in a space, and diffract light beams of multiple wavelengths at a same angle, unlike the abovementioned corrugated typed diffraction grating. Therefore, with one light guide plate, it is possible to allow a user to perceive an RGB image. On the other hand, these holograms are characterized in that a viewing angle is relatively narrow, because only a one-dimensional replication function is provided, whereas the abovementioned corrugated typed diffraction grating can realize a wide viewing angle, because it replicates a light beam in two-dimensional directions in the light guide plate.

Japanese Unexamined Patent Application Publication (Translation of PCT Application) No. 2008-523435 discloses a technology of an exit pupil extender that is advantageously suited for such an image display device.

SUMMARY OF THE INVENTION

The present invention relates to a technology that improves brightness of an image to be perceived by a user and enhances visibility concerning a light guide plate (an image display element) having corrugated type diffraction gratings which are advantageous for realizing a wide viewing angle and an image display device using such light guide plate.

The following description proceeds only for a light guide plate having corrugated type diffraction gratings as the light guide plate. Moreover, image inversion by the lens action of the eye and an effect in which an image projected on the retina is further inverted through processing in the brain before it is perceived are left out of description. With regard to a projected image projected on a front screen from a light source for imaging located on the same side as the eyes with respect to the light guide plate, a relation between the positions of pixels and brightness is discussed. An image that is actually visualized is the abovementioned image turned upside down.

Light having image information is coupled in by an incident diffraction grating provided in the light guide plate so that light beams with wavenumber vectors allowing for guiding the beams in total reflection propagate through the light guide plate. A subset of the light beams that intersect an exit diffraction grating is diffracted and emitted from the light guide plate, having a wavenumber vector equivalent to an original imaging light beam. Image information that is provided to a user includes advancing angle information, i.e., a wavenumber vector depending on a pixel position in original image information. To emit image information for one pixel from the light guide plate so as to allow it to arrive at the user's pupil, it is required to emit it from a specific position in the light guide plate, the specific position being determined by an advancing angle, distance between the light guide plate and the user's pupil, and size of the user's pupil.

Because light beams are replicated and spread spatially in the light guide plate and go out as described previously, the light beams that are visualized by the user will be fewer when spreading more widely, and visualized brightness will decrease. Meanwhile, because an exit position that is visualized by the user changes depending on pixel position in original image information, it is unavoidable that brightness changes depending on pixel position in the case of an image display device using a light guide plate. Brightness becomes darkest, particularly, at pixel positions in corners in original image information, as will be described later.

The above-noted characteristics of the light guide plate are a common challenge for the related art including the technologies described in Japanese Unexamined Patent Application Publication (Translation of PCT Application) No. 2017-528739, U.S. Patent Publication 2016/0231566A1, and Published PCT International Application WO99/52002. Meanwhile, an exit pupil extender described in Japanese Unexamined Patent Application Publication (Translation of PCT Application) No. 2008-523435 makes it possible to extend the diameter of a beam irradiated on an incident diffraction grating (or the beam diameter is also termed as the size of an entrance pupil) and propagate beams to an exit diffraction grating. However, because an angle between a light beam diffracted by an intermediate grating and the original light beam does not exceed 90 degrees as will be described later, there is a problem of difficulty to enhance the brightness of pixels positioned in corners.

The present invention is intended to improve brightness of an image to be perceived by a user and enhance visibility concerning a light guide plate (an image display element) having diffraction gratings and an image display device using such light guide plate.

One preferable aspect of the present invention resides in a light guide plate including an incident diffraction grating which diffracts incident imaging light, an exit diffraction grating through which the imaging light goes out, and an intermediate diffraction grating existing in optical paths from the incident diffraction grating to the exit diffraction grating. In this light guide plate, a periodic linear corrugated pattern is formed as the incident diffraction grating, and when an imaginary line is established that passes through an incident point of imaging light onto the incident diffraction grating and is parallel with a periodic direction of the corrugated pattern, the intermediate diffraction grating has a first region on one side of the imaginary line and a second region on another side of the imaginary line and reflects at least a subset of the imaging light at least once in each of the first region and the second region.

Another preferable aspect of the present invention resides in a light guide plate including an incident diffraction grating which diffracts incident imaging light, an exit diffraction grating through which imaging light diffracted by the incident diffraction grating goes out, and an optical element which is provided in optical paths between the incident diffraction grating and the exit diffraction grating and generates second imaging light that is substantially parallel with first imaging light that propagates after being diffracted by the incident diffraction grating.

Another preferable aspect of the present invention resides in an image display device including a projector to emit imaging light and a light guide plate. The light guide plate includes an incident diffraction grating which diffracts incident imaging light from the projector, an exit diffraction grating through which the imaging light goes out, and an intermediate diffraction grating existing in optical paths from the incident diffraction grating to the exit diffraction grating. In the light guide plate, a periodic linear corrugated pattern is formed as the incident diffraction grating, and when an imaginary line is established that passes through an incident point of imaging light onto the incident diffraction grating and is parallel with a periodic direction of the corrugated pattern, the intermediate diffraction grating has a first region on one side of the imaginary line and a second region on another side of the imaginary line and reflects at least a subset of the imaging light at least once in each of the first region and the second region.

It is possible to improve brightness of an image to be perceived by a user and enhance visibility concerning a light guide plate (an image display element) having diffraction gratings and an image display device using such light guide plate.

BRIEF DESCRIPTION OF THE DRAWINGS

FIG. 3 is a schematic plane view depicting how light beams are guided through a light guide plate in an embodiment;

FIG. 4 is a schematic diagram depicting a structure of an intermediate diffraction grating;

FIG. 7 is a graph representing a result of measurement of first order diffraction efficiency and a result of comparison between diffraction models;

FIG. 8 is a plane view depicting the light guide plate in an embodiment;

FIG. 9 is a simulation result diagram showing a proper range of the angle and period of the intermediate diffraction grating in an embodiment;

FIGS. 13A-13C are a set of two aspect views (a plane view and cross-sectional views) depicting the intermediate diffraction grating shape in an embodiment;

FIGS. 15A-15D are schematic diagrams depicting an overall process of forming a light guide plate in an embodiment utilizing a mass production process for optical disks;

DETAILED DESCRIPTION

Figure 1:
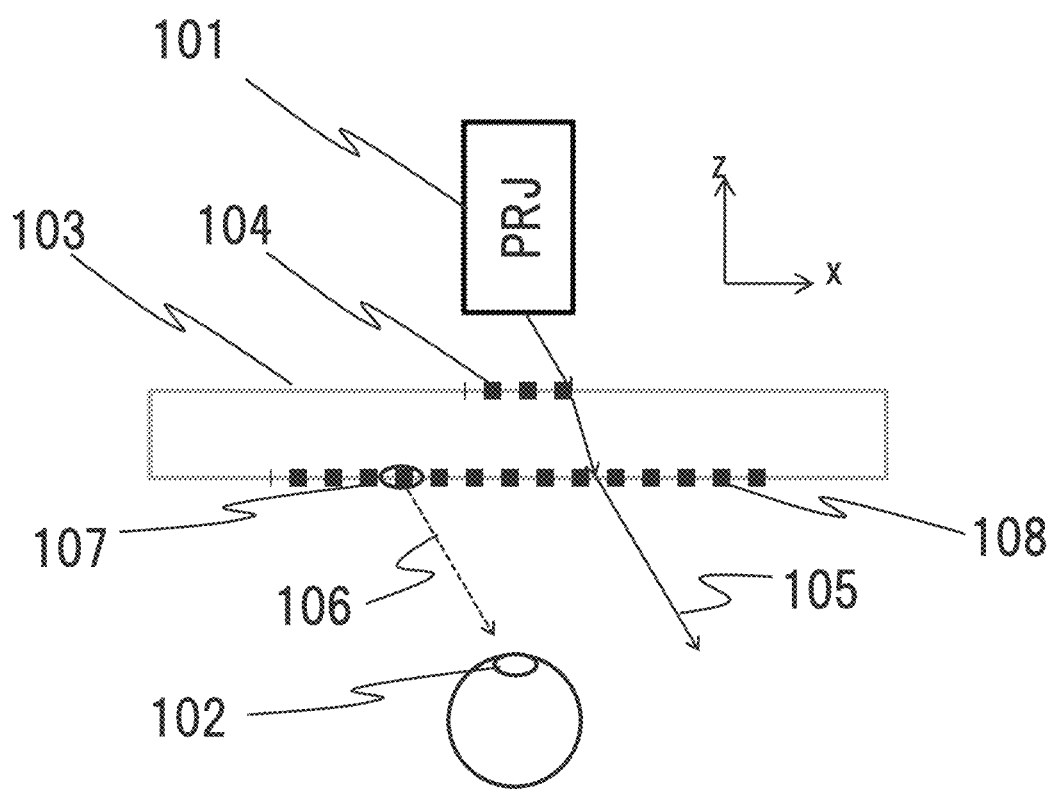
FIG. 1 is a schematic diagram to explain a definition of an exit circle.

In the following, embodiments will be described in detail with the aid of the drawings. However, the present invention should not be construed to be limited to the following description of the embodiments. Those skilled in the art will easily appreciate that a concrete configuration of the present invention may be modified without departing from the idea and spirit of the present invention.

In a configuration of the present invention, which will be described hereinafter, same reference numerals are used commonly across different drawings to identify same components or components having a same function, and a duplicated description may be omitted.

If there are plural elements having a same or similar function, the elements may be described, identified by a same reference numeral with different subscripts. However, if there is no need to identify the plural elements, they may be described without the subscripts.

Notation of "first", "second", "third", etc. herein is affixed to identify components, but it is not necessarily intended to limit the number, sequence, or contents of the components. In addition, numbers to identify components are used on a per-context basis, and a number used in one context does not always denote the same component in another context. Further, it is not precluded that a component identified by a number also functions as a component identified by another number.

In some cases, position, size, shape, range, etc. of each component depicted in a drawing or the like may not represent its actual position, size, shape, range, etc. to facilitate understanding of the present invention. Hence, the present invention is not necessarily to be limited to position, size, shape, range, etc. disclosed in a drawing or the like.

In an embodiment that is described hereinafter, an intermediate diffraction grating comprised of at least one pair or more of diffraction gratings is provided between an incident diffraction grating and an exit diffraction grating and a subset of light beams coupled in by the incident diffraction grating is shifted to a direction in which the beams can be visualized by a user.

The present embodiment proceeds with a description, using a coordinate system in which the optical axis direction is along the z axis and the x-y plane is parallel with a surface of the light guide plate (the surface on which the diffraction gratings are formed). Given that the user's pupil is approximated to a circle, within the light guide plate, an exit position to be visualized by the user depending on pixel position also becomes circular. This will be referred to as an exit circle hereinafter.

FIG. 1 is a schematic diagram to explain what the exit circle is. Here, an example is depicted in which a projector (PRJ) 101 and the user's pupil 102 are positioned opposite to each other across the light guide plate 103. Assuming that the wavenumber vector of the incident diffraction grating 104 goes along the y direction, a light beam within the x-z plane is expressed by an arrow in FIG. 1. From the incident diffraction grating 104, light beams within the x-z plane pass through many paths and arrive at the pupil 102. A light beam 105 depicted in FIG. 1 passes through one of the paths.

Now, FIG. 1 depicts the structure of the light guide plate for one eye of both eyes. Usually, there is a pair of two duplicates of the structure depicted in FIG. 1, one for the right eye and the other for the left eye, and a stereoscopic view can be obtained by projecting a pair of images, one for the right eye and the other for the left eye, from each projector 101.

In a case where the incident diffraction grating 104 does not have wavenumber vector components along the x direction, the light beam 105 irradiated from the projector 101 travels in a right-hand direction in the drawing. Meanwhile, to allow the user to perceive this light beam as a projected image, a light beam passing through a path depicted as a light beam 106 that is visualized in the drawing needs to arrive at the user's pupil 102 at the same angle as the light beam 105.

An exit circle 107 is present on the exit diffraction grating 108 and is an imaginary circle for the user's pupil 102 when translated in the direction of the light beam 106 that is visualized. Only beams that go out of exit circles on the exit diffraction grating 108 are perceived as a projected image by the user and other beams are not perceived.

While a light guide plate depicted in "FIG. 3" in Japanese Unexamined Patent Application Publication (Translation of PCT Application) No. 2017-528739 is equipped with an incident diffraction grating and an exit diffraction grating and a light guide plate depicted in "FIG. 1" in Published PCT International Application WO99/52002 is equipped with an incident diffraction grating, a deflecting diffraction grating, and an exit diffraction grating, the light guide plate's functions for propagating beams, replicating beams, and making beams go out are fundamentally common with the structure in FIG. 1. Therefore, with regard to the light guide plate 103 depicted in FIG. 1, a relation between the positions of pixels and brightness is described with reference to FIG. 1 as well.

Figure 2A:
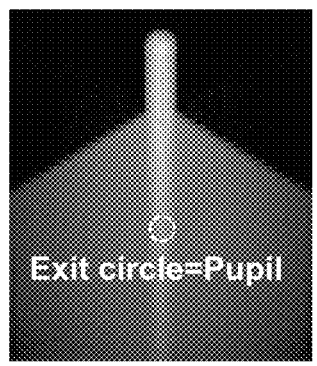
FIGS. 2A and 2B are intensity distribution diagrams of light beams propagating through the light guide plate.
Figure 2B:
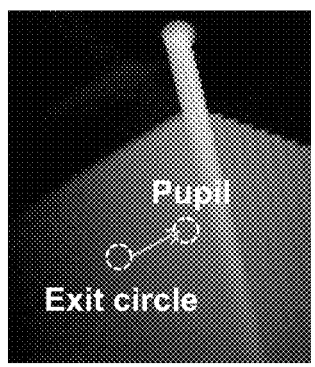

FIGS. 2A and 2B are a distribution of intensity of light beams propagating through the light guide plate 103, calculated using a simulation method which will be described later. In the drawing, the incident diffraction grating 104 is placed in an upper part of the drawing and the pupil 102 that corresponds to the user's eye is placed beneath it. According to the structure in FIG. 1, from the projector 101 that is present on the front side of the plane defined in FIGS. 2A and 2B, a light beam is incident on the plane perpendicularly to the incident diffraction grating 104 and transmitted to the pupil 102 that is on the rear side of the plane.

FIG. 2A depicts a case where pixel positions are in the center of an image projected. A bright contrast part of FIG. 2A is a distribution of intensity of beams toward the pixels in the center of the image. An exit circle depicted as a circle in the drawing denotes a region in which the beams arriving at the pupil 102 have been diffracted finally on the exit diffraction grating 108.

In FIG. 2A, a linear region with high brightness extending in the y direction from the incident diffraction grating 104 denotes a set of main beams (hereinafter a main beam set) diffracted by the incident diffraction grating 104 and propagating through the light guide plate 103. As seen in FIG. 2A, the main beam set has a characteristic in which its intensity gradually attenuates by propagation. A set of beams which spread in a fan shape around the main beam set is the beam set diffracted by the exit diffraction grating 108 and its traveling direction has been deflected within the X-y plane. Under this condition, because the light beam that is projected is incident along the z-axis direction, it is found that the exit circle 107 coincides with the pupil 102 within the x-y plane, as indicated by the circuit in FIG. 2A. Therefore, beams that arrive at the pupil 102 and are perceived as an image are a subset of the main beam set with strong intensity.

FIG. 2B depicts a case where pixel positions are in a right upper corner of an image projected. A bright contrast part of FIG. 2B is a distribution of intensity of beams toward the upper right corner of the image. The main beam set travels toward a right lower direction from the incident diffraction grating 104, as seen in FIG. 2B. Although the position of the pupil 102 is constant, the exit circle 107 is an exit position for a set of beams traveling in a right upper direction toward the pupil, and therefore, its position shifts in a left lower direction with respect to the pupil 102 within the x-y plane. In this case, because the exit circle 107 is in a position distant from the main beam set, the brightness of a set of beams that arrive at the pupil 102 and are perceived as an image becomes lower, as compare with the case of FIG. 2A. This is a main cause of why uneven brightness occurs when an image is projected using a light guide plate.

If, in FIG. 2B, it is possible that the main beam set which is coupled in by the incident diffraction grating 104 and propagates in a right lower direction through the light guide plate 103 is parallel-shifted toward the exit circle 107, it will be possible to improve the brightness of an image that is visualized. Therefore, the present embodiment provides a technology that shifts the main beam set toward the exit circuit by placing an intermediate diffraction grating comprised of diffraction gratings which are of at least two types of patterns between the incident diffraction grating 104 and the exit diffraction grating 108 and reflecting the main beam set twice by the intermediate diffraction grating.

With the objective of brightness improvement, it is desirable to allow light beams diffracted by the intermediate diffraction grating to stay inside the light guide plate 103 so that the beams can be propagated in total reflection. Hence, the intermediate diffraction grating is adapted to have patterns whose direction slants on the order of approximately 20 to 40 degrees relative to the direction of the pattern of the incident diffraction grating. It is preferable to adjust the pitch of the above patterns at a ratio ranging from 1/1.5 to 1/2.0 as compared with the pitch of the incident diffraction grating. Thereby, it would become possible to correct a position gap between the main beam set and the exit circle depending on pixel position and improve the brightness of an image to be visualized.

Referring to FIG. 3, a description is provided about light beams diffracted by the intermediate diffraction grating thus mentioned. FIG. 3 is an x-y plane view when the light guide plate 103 is viewed from the z direction, where the incident diffraction grating 104, the exit diffraction grating 108, and the intermediate diffraction grating 300 are depicted. A light beam 310a having information of a particular pixel diffracted by the incident diffraction grating 104 becomes a light beam 310b by being reflected and diffracted by the intermediate diffraction grating 300 and the light beam 310b becomes a light beam 310c by being further reflected and diffracted. At this time, the light beam 310c has the same wavenumber vector, i.e., angle information of the same pixel position as the original light beam 310a and arrives at an exit circle 107-1 that allows the pixel to be visualized in the exit diffraction grating 108. The light beam 310c is diffracted and visualized by a user. On the other hand, the original light beam 310a is not visualized because it does not arrive at the exit circle 107-1.

Likewise, a light beam 320a having information of another pixel is also reflected and diffracted twice through the intermediate diffraction grating 300 and becomes a light beam 320c and this beam arrives at an exit circle 107-2 and is visualized by a user.

Here, on the x-y plane, a line passing through an incident point I on the incident diffraction grating 104 and being perpendicular to the pattern of the incident diffraction grating 104 is assumed to be a center line Cy. Typically, the user's eyes (pupils 102) are present along the center line cy and at 1 to 3 cm apart from the light guide plate 103 in the z direction, and the light beams 310c, 320c outgoing from the exit diffraction grating 108 in the z direction can be visualized when incident on the pupils. The diameter of each pupil 102 is usually on the order of 2 mm.

As will be described later, a function of shifting light beams by reflection and diffraction in this way can be implemented by the intermediate diffraction grating 300 with a pair of two types of patterns. By first-time diffraction, the light beams 310a, 320a from the incident diffraction grating 104 are reflected and diffracted to return in the direction of the incident diffraction grating 104 across the center line Cy and become the light beams 310b, 320b. Then, the beams are reflected and diffracted again in a direction opposite to the incident diffraction grating 104 and becomes the thus shifted light beams 310c, 320c. By adjusting the angles of the two types of patterns forming the pair, it would be possible to make a parallel displacement of the light beams diffracted by the incident diffraction grating 104 in the x-axis direction and let the beams go out from the exit diffraction grating 108.

In FIG. 3, the intermediate diffraction grating 300 includes a pair of intermediate diffraction gratings 300A, 300Cc to shift light beams rightward in the x direction and a pair of intermediate diffraction grating 300B, 300D to shift light beams leftward in the x direction. Although there may be only one pair in some situations, two pairs would provide symmetrical balanced brightness of an image to be visualized. In this case, because it is desirable that rightward and leftward shifts are equal in amount, it is desirable that the intermediate diffraction grating 300 has a pattern structure that is line-symmetric with respect to the center line Cy. Also, to make a parallel displacement of light beams, it is desirable that the intermediate diffraction grating 300 has a pattern structure that is line-symmetric with respect to a parting line Cy that separates the intermediate diffraction gratings 300A, 300C and separates the intermediate diffraction gratings 300B, 300D in a vertical direction to the center line Cx.

Although the intermediate diffraction grating 300 is placed in optical paths from the incident diffraction grating 104 toward the exit diffraction grating 108; no limitation is intended to its placement in FIG. 4. A part of it may overlap with the incident diffraction grating 104 and/or the exit diffraction grating 108 and plural intermediate diffraction gratings 300 may be present.

Here, a description is provided about the difference between the present embodiment and the exit pupil extender described in "Japanese Unexamined Patent Application Publication (Translation of PCT Application) No. 2008-523435" for understanding of the structure in the present embodiment. In "FIG. 8" in "Japanese Unexamined Patent Application Publication (Translation of PCT Application) No. 2008-523435", a plan view of an optical substrate including an intermediate diffraction grating, an incoupling diffraction grating, and an outcoupling diffraction grating is presented. A light beam incident on the incoupling diffraction grating spreads spatially into beams through the intermediate diffraction grating and the beams are propagated to the outcoupling diffraction grating and go out of the light guide plate.

In "FIG. 10" in "Japanese Unexamined Patent Application Publication (Translation of PCT Application) No. 2008-523435", operation of the intermediate diffraction grating is explained. A light beam emitted from a left lower direction in "FIG. 10" is +1 order diffracted rightward in the drawing inside the intermediate diffraction grating and −1 order diffracted after propagation, thereby making the width of outgoing light larger than the width of incident light. Here, an incident diffraction grating not depicted is placed in a left lower direction in "FIG. 10" (the direction in which incident light arrives).

In the same coordinate system as used in "Japanese Unexamined Patent Application Publication (Translation of PCT Application) No. 2008-523435" assuming that a normal vector of the plane on which the incident diffraction grating corresponds to a z axis, a light beam diffracted by the incident diffraction grating and incident on the intermediate diffraction grating is assumed to have a wavenumber vector $k=(k_x, k_y, k_z)$ and a light beam diffracted first time by the intermediate diffraction grating is assumed to have a wavenumber vector $k^m=(k^m_x, k^m_y, k^m_z)$. To optimize the effect of extending the pupil, the technology disclosed in "Japanese Unexamined Patent Application Publication (Translation of PCT Application) No. 2008-523435" makes a light beam diffracted first time by the intermediate diffraction grating travel in a direction opposite to the incident diffraction grating, not in the direction of the incident diffraction grating. This is disclosed in, inter alia, paragraph 0006 and "FIG. 10" in "Japanese Unexamined Patent Application Publication (Translation of PCT Application) No. 2008-523435". Hence, an inner product of two wavenumbers is $k \cdot k^m > 0$.

In the embodiment which will be described hereinafter, a light beam diffracted first time by the intermediate diffraction grating travels in the direction of the intermediate diffraction grating. An angle between two wavenumber vectors k and $k^m$ is 90 degrees or greater; the angle is favorable, preferably, on the order of 120 degrees. The inner product of two wavenumbers is $k \cdot k^m < 0$. Thereby, parallel displacement of light beams is possible. Thus, it would be possible to allow for efficient arrival of light beams containing image information which have a wider viewing angle range, i.e., angle range for the user's eyes.

FIG. 4 depicts how light is diffracted on the surface of the light guide plate 103 for comparison in terms of diffracted light between "Japanese Unexamined Patent Application Publication (Translation of PCT Application) No. 2008-523435" and the present invention. In FIG. 4, a diffracted light beam 1 that results from diffraction of an incident light beam incoming from underneath once by the intermediate diffraction grating is a light beam diffracted by the intermediate diffraction grating in "Japanese Unexamined Patent Application Publication (Translation of PCT Application) No. 2008-523435" and a diffracted light beam 2 is a light beam diffracted in the present embodiment.

Assuming that an incident light beam diffracted by the incident diffraction grating 104 travels along the y axis, assuming that the angle ρ of the intermediate diffraction grating described in "Japanese Unexamined Patent Application Publication (Translation of PCT Application) No. 2008-523435" is 45 degrees which is substantially central in the range of 0 to 70 degrees disclosed in the publication, and that a conical diffraction angle ranges from 50 degrees to 70 degrees as described in "claim 2" in the publication, an angle between the incident light beam and the diffracted light beam is 15 degrees±10 degrees.

By contrast, for the purpose of improving brightness according to the structure in FIG. 3 presented previously, it is necessary to reverse the x-direction component of a light beam by reflection and diffraction, as the light beam 310a is diffracted into the light beam 310b and the light beam 320a is diffracted into the light beam 320b. To implement this, it is required that an angle between a diffracted light beam 2 in the present embodiment and an incident light beam (the angle by which a light beam is deflected, i.e., the angle by which it is redirected) exceeds 90 degrees.

According to "FIG. 4" in "Japanese Unexamined Patent Application Publication (Translation of PCT Application) No. 2008-523435", it can be seen that the sign of the x-direction wavenumber of a light beam remains unchanged after the beam is diffracted once by the intermediate diffraction grating. Assuming d to denote the pitch of the incident diffraction grating and d' to denote the pitch of the intermediate diffraction grating and assuming that an angle between the pattern direction of the incident diffraction grating 30 (in the y-axis direction) and the pattern direction of the intermediate diffraction grating 44 is 60 degrees, as disclosed in paragraph 0031 and "FIG. 4" in "Japanese Unexamined Patent Application Publication (Translation of PCT Application) No. 2008-523435" as a typical value for the technology disclosed in the publication, d'/d=1 according to Equation 1 in "Japanese Unexamined Patent Application Publication (Translation of PCT Application) No. 2008-523435".

Figure 5A:
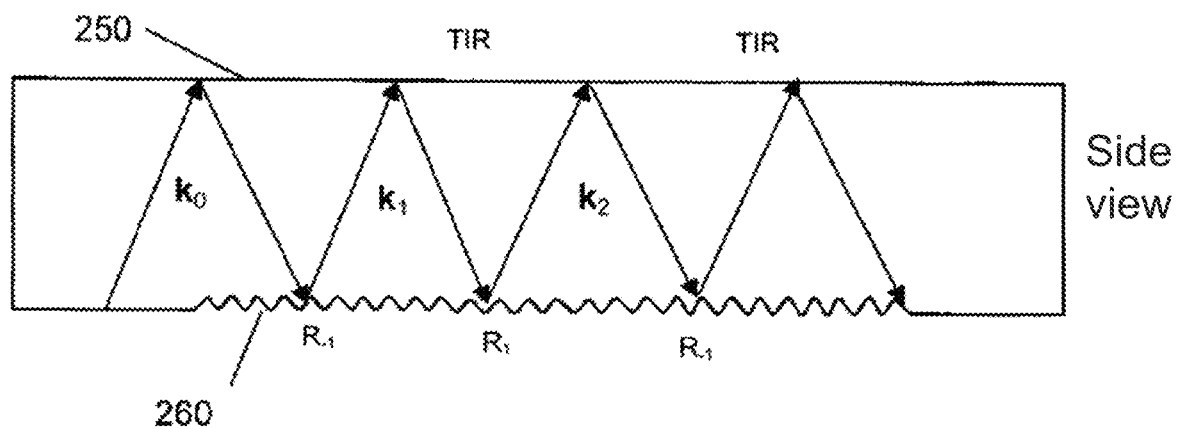
FIG. 5A is a schematic cross-sectional view depicting how light beams are guided through a light guide plate which is a comparison example.

FIG. 5A is cited from "Japanese Unexamined Patent Application Publication (Translation of PCT Application) No. 2008-523435" and corresponds to "FIG. 9a" in the publication. A light beam diffracted by the incident diffraction grating has a wavenumber k0 and has a wavenumber k1 when diffracted once (odd number of times) by the intermediate diffraction grating 260 and a wavenumber k2 when diffracted twice (even number of times) by this grating. Because the light beam is diffracted by the same diffraction grating, it is obvious that k2=k0.

Figure 5B:
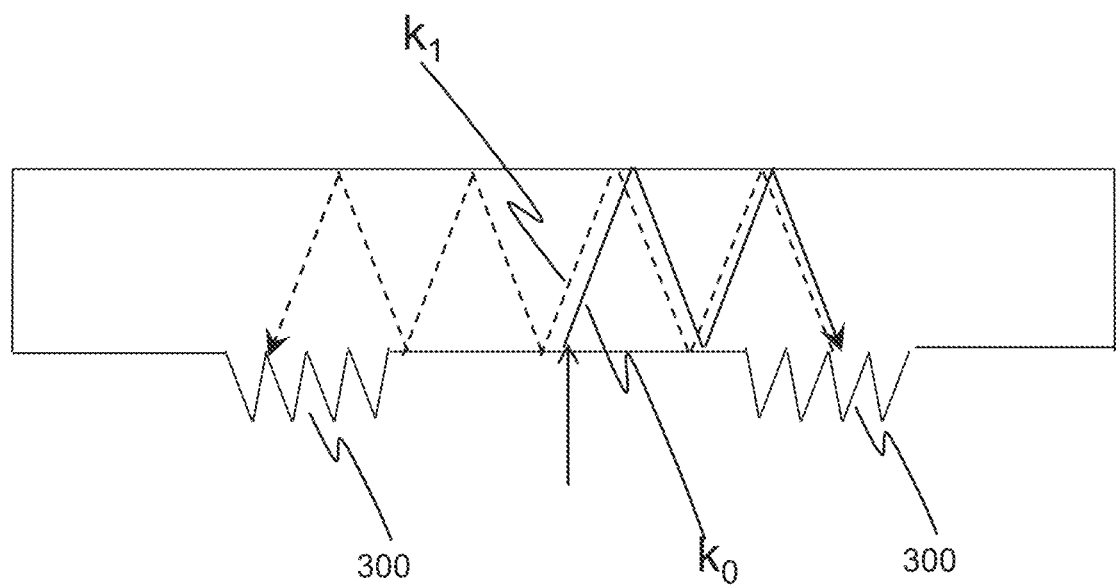
FIG. 5B is a schematic cross-sectional view depicting how light beams are guided through the light guide plate in an embodiment.

FIG. 5B depicts diffraction by the intermediate diffraction grating in the present embodiment in similar representation. Assuming that the wavenumber of a light beam diffracted by the incident diffraction grating is k0, a beam with a wavenumber k1 diffracted once by the intermediate diffraction grating propagates in an opposite direction to k0. For a head mount display, it is desired to provide image information with a wide viewing angle to a user. Therefore, the k1 beam has a wide angle range. Since it is obvious that the k1 beam propagates in total reflection internally in the light guide plate, one feature of the present embodiment is that light beams are diffracted to fulfill that k1 has a reverse sign to k0 and |k0|≤|k1| so that light beams diffracted once by the intermediate diffraction grating 300 will easily propagate in total reflection internally in the light guide plate, i.e., so that the brightness of an image to be visualized by a user will be improved.

The present invention is described below with reference to the drawings. To facilitate understanding of the present embodiment, a definition of shape parameters of diffraction gratings is briefly given.

Figure 6A:
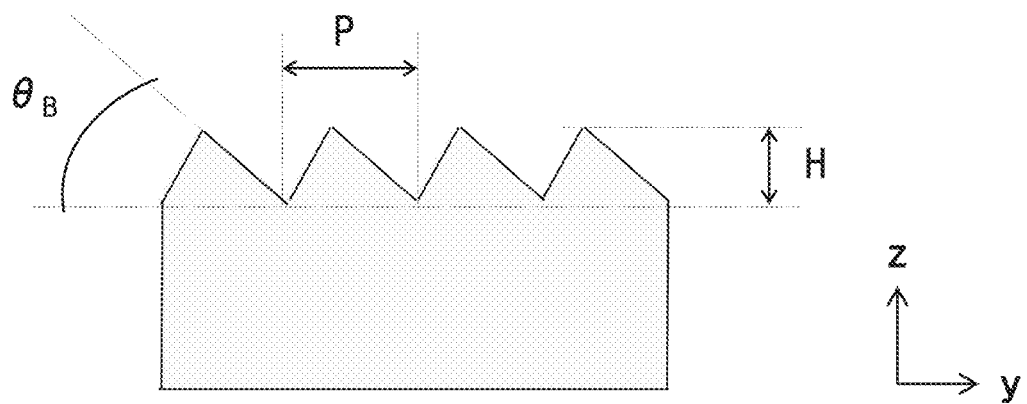
FIG. 6A is a cross-sectional view depicting a definition of shape parameters of an incident diffraction grating or an intermediate diffraction grating.
Figure 6B:
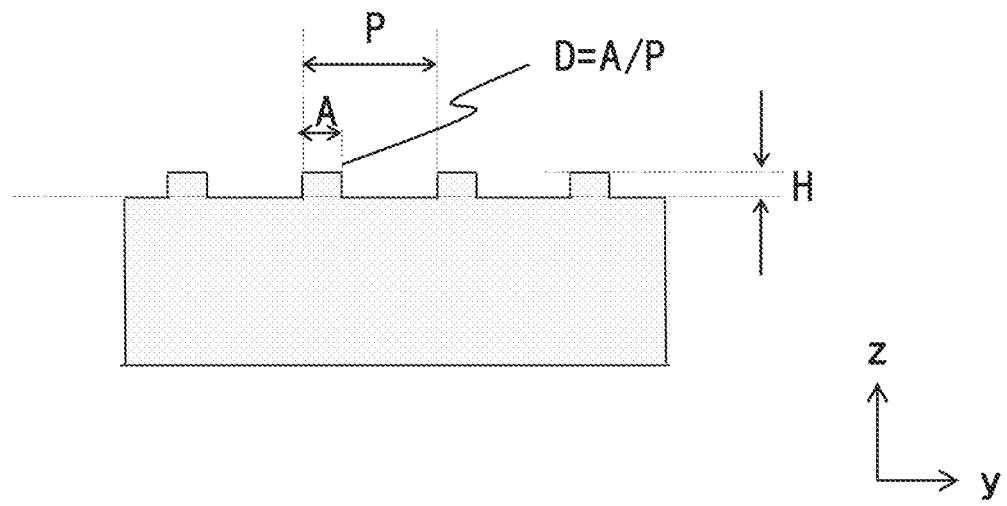
FIG. 6B is a cross-sectional view depicting a definition of shape parameters of an exit diffraction grating.

FIG. 6A and FIG. 6B are diagrams to explain a definition of shape parameters of diffraction gratings. FIG. 6A is a cross-sectional view of the incident diffraction grating or the intermediate diffraction grating. As depicted in FIG. 6A, the incident diffraction grating and the intermediate diffraction grating are defined by pitch (period) P, height H, and braze angle $\theta_B$.

FIG. 6B is a cross-sectional view of the exit diffraction grating. As depicted in FIG. 6B, the exit diffraction grating is defined by pitch P, height H, and duty D. Examples depicted here illustrate typical shapes of gratings as the incident diffraction grating and the exit diffraction grating. Other gratings such as a sinusoidal diffraction grating may be used in the present embodiment.

Then, a simulation method for analyzing an image display element of the present embodiment is described. A ray tracing method proposed by G. H. Spencer, et al. in 1962 [G. H. Spencer and M. V. R. K. Murty, "General Ray-Tracing Procedure", J. Opt. Soc. Am. 52, p. 672 (1962)] is a method that looks at particulates of light and traces their paths, thereby calculating an image or the like that is observed at a point, and this method continues to be improved vigorously mainly in a field of computer graphics [16-18]. A Monte Carlo ray tracing method based on the ray tracing method [I. Powell "Ray Tracing through systems containing holographic optical elements", Appl. Opt. 31, pp. 2259-2264 (1992).] is a method that stochastically processes path splitting by diffraction and reflection among others to prevent exponential increasing of calculation amount, and this method is suitable for simulation of a light guide plate which repeats diffraction and propagation in total reflection. The Monte Carlo ray tracing method enables reproducing reflection and refraction faithfully. However, as for diffraction, it is necessary to develop a model that is fit for it.

For a light guide plate for a head mount display, such a diffraction model is essential that covers a range of wavelengths (about 400 to 700 nm) over the visible light spectrum and an incident angle range matching for a viewing angle 40° of a projected image. A diffraction model that is used in the present embodiment is described below.

In the following description, it is assumed that the optical axis is along the z-axis direction and the normal vector of the light guide plate is along the z-axis direction, and at least a diffraction grating is formed on the upper or rear surface of the light guide plate. To simplify explanation, it is also assumed that the projector optics and the pupil are positioned opposite to each other across the light guide plate. If both are present on the same side of the light guide plate, operation of revering a light beam outgoing from the light guide plate using an x-y plane mirror should be added in a context concerning wavenumber vectors in the following description.

The wavenumber vector of a light beam incident on the light guide plate is assumed as in Equation 1.

[Equation 1]

$$k^i = (k_x^i, k_y^i, k_z^i) \tag{1}$$

The wavenumber vector of an outgoing light beam is assumed as in Equation 2.

[Equation 2]

$$k^o = (k_x^o, k_y^o, k_z^o) \tag{2}$$

Information of an image that is projected is comprised of intensity, wavelength, and pixel information, and the wavelength and the pixel information are determined by information of a light beam angle, i.e., a wavenumber vector by the lens action of the eye. To store the wavelength and the pixel information of an image that is projected, the wave guide plate is required to act, satisfying Equation 3 below.

[Equation 3]

$$k^o = k^i \tag{3}$$

Diffraction of a light beam is expressed by adding the inner product of a diffraction order and the diffraction grating's wavenumber vector to the light beam's wavenumber vector. With regard to diffraction occurring when the incident light beam intersects the diffraction grating for the n-th time, assuming that the light beam's wavenumber vector changes from $k_n$ to $k'_n$, a relation expressed in Equation 4 is fulfilled.

[Equation 4]

$$k'_n = k_n + m_n \cdot K_n \quad (4)$$

Here, $m_o$ is a diffraction order and $K_o$ is the wavenumber vector of the diffraction grating at the n-th time intersection with the light beam. When the light beam having intersected the diffraction grating for the n-th time is diffracted and goes out of the light guide plate, a relation expressed in Equation 5 below is fulfilled according to Equation 3.

[Equation 5]

$$\Sigma_{n=1}^{N} m_n \cdot K_n = 0 \quad (5)$$

This expresses a fundamental action of the light guide plate. Decomposing Equation 4 into the x, y, and z components gives Equations 6 to 9 below.

[Equation 6]

$$k'_{n,x} = k_{n,x} + m_n \cdot K_{n,x} \quad (6)$$

[Equation 7]

$$k'_{n,y} = k_{n,y} + m_n \cdot K_{n,y} \quad (7)$$

[Equation 8]

$$D_{n,m_n} = (|k_{n,x}|^2 + |k_{n,y}|^2 + |k_{n,z}|^2) - (|k'_{n,x}|^2 + |k'_{n,y}|^2) \quad (8)$$

[Equation 9]

$$k'_{n,z} = \sqrt{D_{n,m_n}} \quad (9)$$

Here, subscripts x, y, and z denote the x, y, and z components of each wavenumber vector. When $D_{m, mn} < 0$, the wavenumber vector becomes an imaginary number and this means that no diffracted light beams occur under specified conditions. Using $\beta_{n, mn}$, occurrence of diffracted light beams is defined as in Equation 10 below.

[Equation 10]

$$\beta_{n,m_n} = \begin{cases} 1, & D_{n,m_n} \geq 0 \\ 0, & D_{n,m_n} < 0 \end{cases} \quad (10)$$

Assuming that diffraction efficiency is expressed as $\eta_{n, mn}$, Equation 11 below is obtained according to an energy conservation law.

[Equation 11]

$$S = \Sigma_{m_n} \eta_{n,m_n} = 1 \quad (11)$$

Assuming θn to denote an incident angle on the plane spanning the wavenumber vector Kn of the diffraction grating and the z axis, diffraction efficiency $\eta'_{n, nm}$, taking account of occurrence or no occurrence of diffracted light beams and dependence on the incident angle is modeled as in Equation 12 below.

[Equation 12]

$$\eta'_{n,m_n} = \eta^o_{m_n} \cdot \beta_{n,m_n} \cdot \frac{1}{\sum_{m_n} \eta^o_{m_n} \cdot \beta_{n,m_n}} \cdot (1 + \gamma \cdot \sin\theta_n) \quad (12)$$

Here, $\eta^o_{mn}$ is diffraction efficiency for perpendicularly incident light beams diffracted in order $m_n$ at the n-th time intersection. In the right side of Equation 12, the second term represents occurrence or no occurrence of diffracted light beams, the third term represents an expression by the energy conservation law, and the fourth term represents dependence on the incident light with a constant of γ, respectively.

As commercially available software adopting a Monte Carlo ray tracing method, there is, inter alia, LightTools (trademark) intended for designing illumination optical systems. However, because this software is unable to treat dependence on angle, diffraction efficiency becomes as in Equation 13 below.

[Equation 13]

$$\eta'_{n,m_n} = \eta_{m_n}^o \cdot \beta_{n,m_n} \quad (13)$$

Here, as a braze type diffraction grating which is the same as the incident diffraction grating, a commercially available grating element #47-551 with a grating density of 1800 lines/mm supplied by the company Edmund is used and measurements are taken of a relation between an incident angle of light of a wavelength of 532 nm and diffraction efficiency.

FIG. 7 represents a result of measurement of first order diffraction efficiency and a result of comparison between diffraction models. An experiment result 701 represented by dots shows that a range of incident angles when both +1 order and −1 order diffracted light beams take place is ±3°. As seen in FIG. 7, +1 order diffracted light takes place with an incident angle of −3° or more and coexists with −1 order diffracted light up to +3° and −1 order diffracted light disappears when the incident angle exceeds +3°. In FIG. 7, a conventional model 702 corresponds to a diffraction model according to Equation 13, and in this model, diffraction efficiency is constant independently of incident angle. Therefore, this model cannot express a time when both +1 and −1 order diffracted light beams exist and a time when −1 order diffracted light disappears, depending on incident angle, and a decrease in diffraction efficiency when the incident angle increases. By contrast, a model 703 according to Equation 12 concisely expresses dependence-on-angle of diffraction efficiency of the braze diffraction grating and it is found that this model is consistent with the experiment result 701.

A description is provided about conditions of parameters preferable for an imaging element in the present embodiment, obtained by a Monte Carlo simulator in which the foregoing model is implemented. In the following, simulation conditions described below are used, unless specified particularly. The wavelengths of RGB lights of a light source are R=635 nm, G=550 nm, and B=460 nm. Spreading of wavelength of the light source is 20 nm, common for the respective colors. The aspect ratio of a projected image is 16:9. The number of pixels is 1280×720. The diameter of a beam incident on the light guide plate is 4 mm. The diameter of the eye pupil is 2 mm. The distance between the eye and the light guide plate is 17 mm. These are values applicable for a typical image display device. As for the light guide plate, its fundamental structure is assumed to be the same as described in Japanese Unexamined Patent Application Publication (Translation of PCT Application) No. 2017-528739. The light guide plate made of plastics according to the present embodiment has a refraction index of 1.58 and its thickness is 1.0 mm. The size of the incident diffraction grating is 5 mm×5 mm and size of the exit diffraction grating is assumed to be sufficiently large.

In addition, reflectance R for light beams having interested a plane where no diffraction grating is formed on the light guide plate is expressed by Fresnel formula which is well known, assuming n to denote the refraction index of the light guide plate, A to denote an incident angle, and B to denote a refraction angle.

[Equation 14]

$$r_p = \frac{\cos A - n\cos B}{\cos A + n\cos B} \quad (14)$$

$$r_s = \frac{n\cos A - \cos B}{n\cos A + \sin B}$$

$$R = \begin{cases} \frac{|r_p|^2 + |r_s|^2}{2}, & |n\sin A| < 1 \\ 1, & |n\sin A| \geq 1 \end{cases}$$

Here, rp is amplitude reflectance of p-polarized light and rs is amplitude reflectance of s-polarized light. In Equation 14, |n sin A|≥1 represents a condition for total reflection.

First Embodiment

FIG. 8 depicts a structure of an image display element in the present embodiment. In the present invention, descriptions are provided hereinafter, using period P of a surface corrugated pattern and an angle θ with respect to the x axis as parameters that determine a diffraction grating's wavenumber vector. In the drawing, an incident diffraction grating 104 (period P and angle θi=0), an exit diffraction grating 108 (period P and angle θo), and an intermediate diffraction grating 300 (period Pm and angle θm) are formed on the light guide plate 103. The incident diffraction grating 104 is comprised of corrugations (ridges and grooves) extending linearly in the x direction, i.e., a linear grating, and the period of the corrugations as a pattern is P. A periodic direction of the pattern of the incident diffraction grating 104 is along the y direction. The exit diffraction grating 108 is a linear grating having the same pattern period P as the incident one and its each grating has an angle of θo with respect to the x axis. In the case of the light guide plate described in Japanese Unexamined Patent Application Publication (Translation of PCT Application) No. 2017-528739, the exit diffraction grating includes two diffraction gratings with θo being +30° and −30° respectively formed on the light guide plate surfaces which are opposite to each other. The intermediate diffraction grating 300 is provided in optical paths between the incident diffraction grating 104 and the exit diffraction grating 108 and selectively reflects and diffracts first imaging light to generate second imaging light that is substantially parallel with the first imaging light propagating, after diffracted by the incident diffraction grating 104.

In the case of FIG. 8, the intermediate diffraction grating 300 is comprised of two pairs of diffraction gratings 300A, 300B and 300C, 300D, the pairs opposing to each other across a center line (imaginary line) Cy which is parallel with the direction of the pattern period of the incident diffraction grating 104 (Cy is parallel with the y axis and perpendicular to the x axis in FIG. 8). The period of corrugations as a pattern of the intermediate diffraction grating 300 is Pm and the grating has an angle of ±θm with respect to the x axis. Hence, in the structure in FIG. 8, the angle θm of the pattern of the intermediate diffraction grating 300 shifts by ±θm relative to the angle of the pattern of the incident diffraction grating 104. In this structure, light having image information coupled in by the incident diffraction grating 104 and diffracted light beams as a main beam set propagate in a right lower direction. This means that propagation occurs in the same conditions as for the foregoing simulation result. The exit circle is present in a position sifting leftward relative to the incident diffraction grating.

In the present structure, a subset of the main beam set is diffracted by a right lower part 300D of the intermediate diffraction grating 300 and propagates toward a left upper part 300B. Light beams diffracted by the left upper part 300B of the intermediate diffraction grating propagate as plural beam sets parallel with the main beam set toward the exit circle 107. In this way, the main beam set can be shifted toward the exit circle 107 which is an exit position of light to be visualized, and brightness of an image to be visualized can be improved. Similar diffractions are also performed in parts 300A and 300B symmetrically with respect to the center line Cy.

Figure 19:
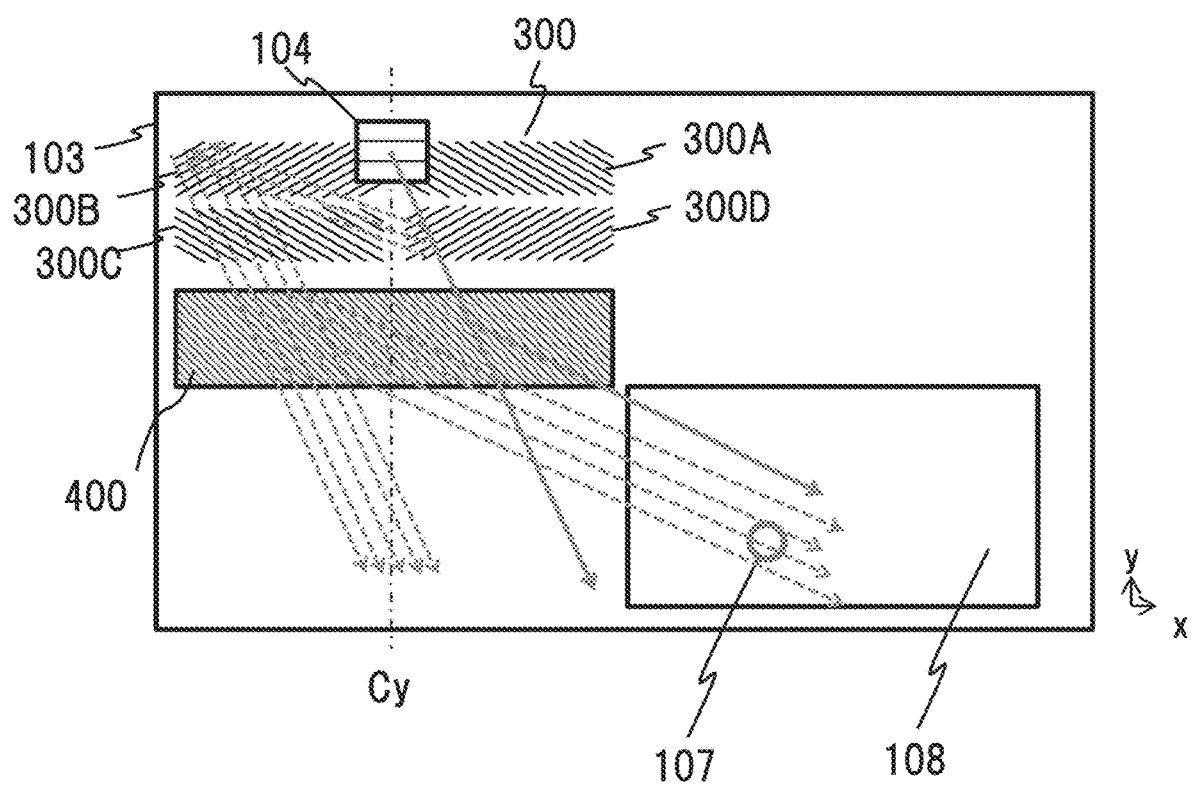
FIG. 19 is a plane depicting another form of a light guide plate in an embodiment.

Now, in FIG. 8, as for light beams propagating at right angles in the y direction from the incident diffraction grating 104, there is less need to diffract such beams by the intermediate diffraction grating 300, because intensity is strong in the vicinity of the exit circle, as described with FIGS. 2A and 2B. Therefore, the pattern of the intermediate diffraction grating may not be formed in a section near the center line Cy. Moreover, a diffraction mirror 400 or the like for bending optical paths may be inserted between the incident and exit diffraction gratings, as is depicted in FIG. 19, to shift the optical paths in the x-axis direction. Doing so makes it possible to respond flexibly to the position of the user's eye.

FIG. 9 is a simulation result showing a proper condition between the pitch and angle of the intermediate diffraction grating 300 in the present embodiment. Here, the result of a simulation under conditions where the pitch P of the incident diffraction grating is 0.44 µm, incident light wavelength is 0.55 µm, the refraction index of the light guide plate is 1.58, and the viewing angle of a projected image is 40 degrees is shown.

In order to improve brightness of an image to be visualized, (1) a main beam set can be diffracted by the intermediate diffraction grating; (2) it is necessary to reflect and diffract the main beam set to shift them toward the direction of the exit circle; and (3) it is necessary to propagate diffracted light beams in total reflection so that the beams will not leak from the inside of the light guide plate.

A white space region 1001 in the drawing is a range that satisfies the above requirements (1) to (3) and satisfies conditions enabling beam reflection, diffraction, propagation in total reflection. A normalized pitch Pm/P of the intermediate diffraction grating, satisfying this range is between 0.45 and 0.65, inclusive. Also, the angle θm of the intermediate grating falls within a range between 45° and 85°, inclusive. Here, the angle θm of the intermediate grating is the angle of the pattern direction of the intermediate grating with respect to the pattern direction of the incident grating and is established to be an acute angle. Now, as for the pattern direction of the intermediate diffraction grating 300, the orientations of the patterns of the respective parts 300A, 300B, 300C, 300D differ, but the angle θm is the same.

If the viewing angle of a projected image is less than 40°, the foregoing requirement (3) is relaxed and the range that can be realized becomes wider. Now, a region 1002 is the region where beam reflection and diffraction are enabled but propagating beams in total reflection does not take place, and a region 1003 is the region where beam diffraction is enabled but beam reflection and diffraction does not take place.

Figure 10A:
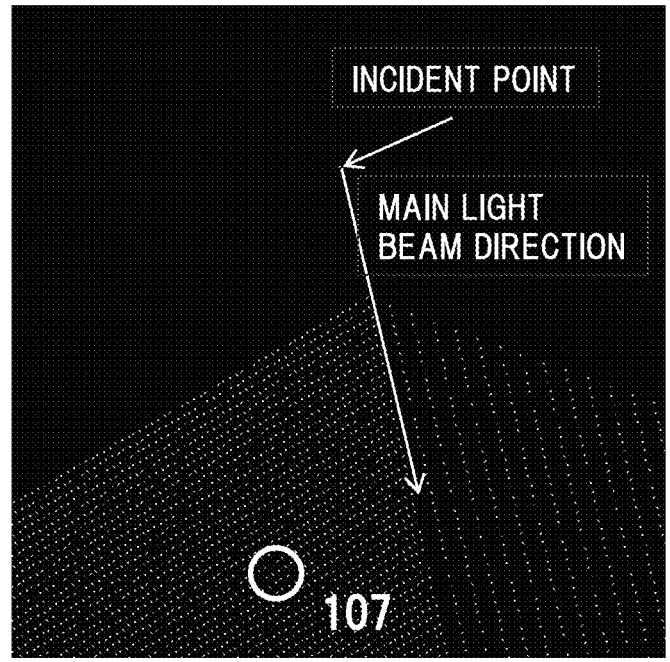
FIG. 10A is a simulation result diagram showing a light beam propagating through a light guide plate which is a comparison example and an intersection at which the beam intersects a diffraction grating.
Figure 10B:
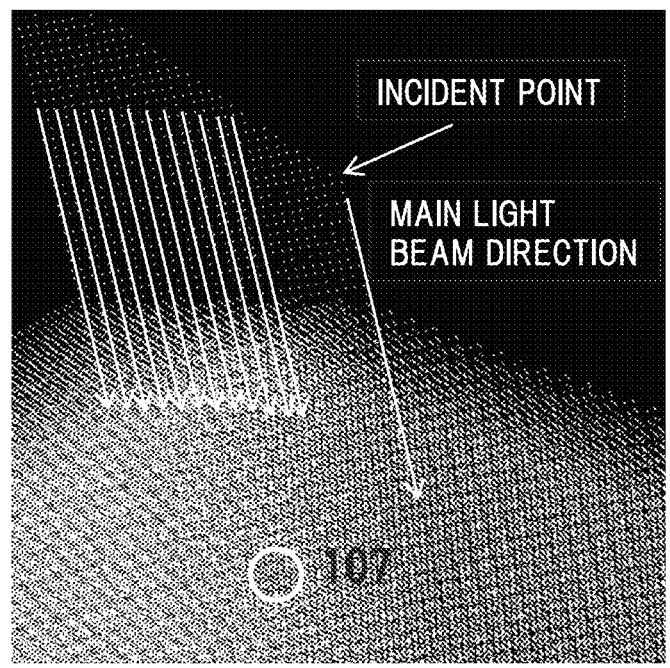
FIG. 10B is a simulation result diagram showing a light beam propagating through the light guide plate in an embodiment and an intersection at which the beam intersects a diffraction grating.

FIG. 10A and FIG. 10B are simulation results showing a light beam propagating through the light guide plate and an intersection at which the beam interests a diffraction grating. The intersection is represented by a white dot in the drawing. As is the case for the foregoing simulation result, the conditions are as follows: the pitch P of the incident diffraction grating is 440 nm, incident light wavelength is 550 nm, the refraction index of the light guide plate is 1.58, and the viewing angle of a projected image is 40 degrees. Pixel positions are assumed to be in a right upper corner of a projected image.

FIG. 10A is a result in a case where the intermediate diffraction grating does not exist. Because the distance between the main beam set and the exit circle 107 is large, brightness of an image to be visualized is small. FIG. 10B is a result in a case where the intermediate diffraction grating is provided. It can be seen that a subset of the main beam set is shifted toward the exit circle 107 by the intermediate diffraction grating and visualized efficiently.

Figure 11A:
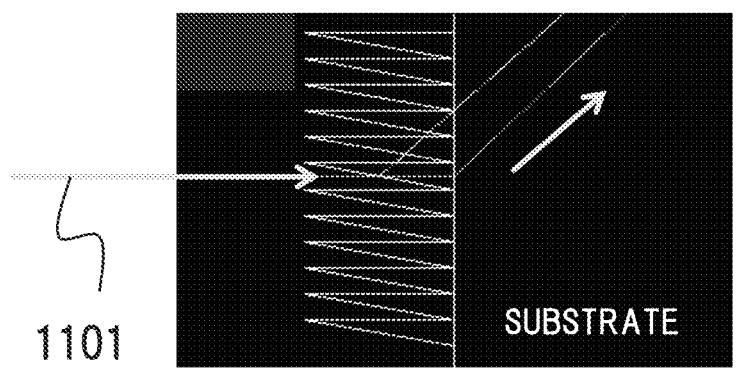
FIG. 11A is a schematic cross-sectional view showing a simulation result of an intermediate diffraction grating of a transmission type.
Figure 11B:
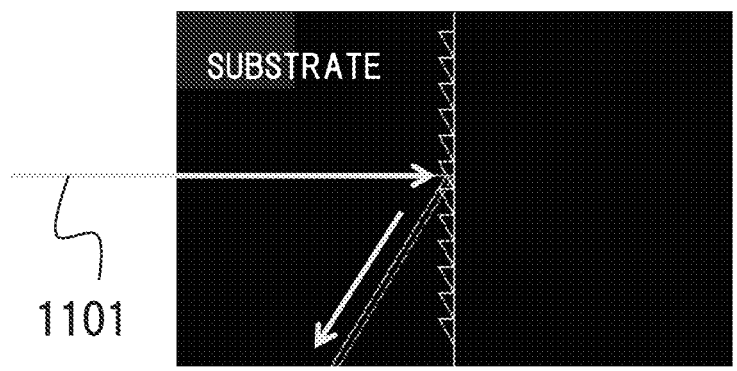
FIG. 11B is a schematic cross-sectional view showing a simulation result of an intermediate diffraction grating of a reflective type.

FIG. 11A and FIG. 11B are simulation results showing an incident diffraction grating preferable for the present embodiment. Here, calculation is performed assuming that wavelength of the light source is 550 nm, the pitch of the diffraction grating is 440 nm, and the refraction index of the substrate is 1.58. In terms of efficiency of light usage, the incident diffraction grating is required to have high efficiency of diffraction. In "FIG. 5" in "U.S. Patent Publication 2016/0231566A1", a triangle diffraction grating with an overhang structure is depicted. This is a superior technology that makes it possible to couple incident light into the light guide plate at high efficiency by transmission diffraction. On the other hand, manufacturing diffraction gratings of this shape requires direct etching of a glass substrate among others, and the above technology is not suited for providing gratings at low cost by applying a stamping technology that is less costly, such as injection molding. Here, a braze type diffraction grating having a normal triangle shape without an overhang structure, which can be manufactured an injection molding process, a 2P (Photo Polymerization) process, etc. is examined.

FIG. 11A is a simulation result for a transmission type diffraction grating which is the same as in "U.S. Patent Publication 2016/0231566A1". An imaging light beam 1101 is incident from left on the grating structure, and a right half of the drawing represents a substrate. In the transmission type diffraction grating, maximum diffraction efficiency is obtained in a condition that refraction by the braze surface and diffraction by the periodic structure are tuned in phase. As shown in FIG. 11A, the height of the corrugated pattern needs to be great, the angle of the pattern needs to be 70 to 80 degrees, and the aspect ratio which is obtained by dividing the pattern height by the period needs to be 10 or more. Generally, transferring of corrugated patters by the 2P process suffers from a problem such as peeling when the aspect ratio exceeds 2, and the yield in mass production decreases. It turns out that the transmission type diffraction grating shown here is not suited for the incident diffraction grating in the present embodiment.

FIG. 11B is a simulation result for a reflection type diffraction grating. An imaging light beam 1101 is incident from left on the grating structure, and a left half of the drawing represents a substrate. In the reflection type diffraction grating, maximum diffraction efficiency is obtained in a condition that reflection by the braze surface and diffraction by the periodic structure are tuned in phase. As seen in the drawing, it turns out that this condition is satisfied with the corrugated pattern having a low aspect ratio in comparison with the transmission type. The height of this corrugated pattern is about 250 nm and the aspect ratio is about 0.57. In the prototype element described previously, it is true that a triangle corrugated pattern with a height of 374 nm can be transferred well. Use of the reflection type diffraction grating can be said to be preferable for the light guide plate in the present embodiment.

Figure 12A:
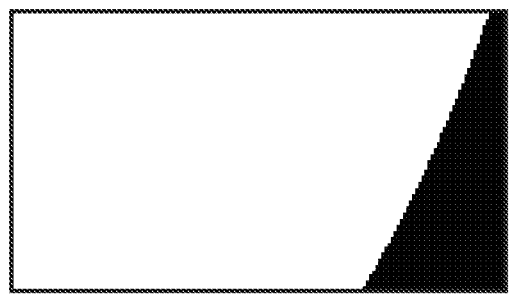
FIG. 12A is a calculation result image diagram of a projected image according to a comparison example.
Figure 12B:
FIG. 12B is a calculation result image diagram of a projected image according to an embodiment.

FIG. 12A and FIG. 12B are simulation results showing a projected image according to the present embodiment. As is the case for the foregoing simulation results, the conditions are as follows: the pitch P of the incident diffraction grating is 440 nm, the incident light wavelength is 550 nm, the refraction index of the light guide plate is 1.58, and the viewing angle of a projected image is 40 degrees. FIG. 12A is a view obtained by an intermediate diffraction grating in accordance with "Equation 1" in "Japanese Unexamined Patent Application Publication (Translation of PCT Application) No. 2008-523435". FIG. 12B is a view obtained by the intermediate diffraction grating in the present embodiment. Brightness decreases in a right edge part of the screen in FIG. 12A, whereas a projected image with a wide range can be provided to a user, as seen in FIG. 12B, through an advantageous effect of the present embodiment that reverses a direction in which light travels by the intermediate diffraction grating.

FIGS. 13A to 13C are schematic diagrams depicting a planar surface and a cross-sectional shape of the light guide plate in the present embodiment. A direction in which light travels along a cross-section along line S-S' in FIG. 13A is illustrated in FIG. 13B and FIG. 13C. FIG. 13B depicts action of an intermediate diffraction grating 300D. In FIG. 13B, a point i indicates the center of the incident diffraction grating 104. As seen in the drawing, light travels from the point i toward the intermediate diffraction grating 300D, while repeating total reflection. A period p at which this light beam intersects the rear surface of the light guide plate 103 (the surface opposite to the surface on which the intermediate diffraction grating is formed) is determined depending on how the beam is diffracted by the incident diffraction grating. A subset of light beams is diffracted by the intermediate diffraction grating 300D and travels toward the direction of an intermediate diffraction grating 300B, as indicated by a dotted line in FIG. 13B.

FIG. 13C is a schematic diagram depicting action of the intermediate diffraction grating 300B, following FIG. 13B. A subset of light beams that arrive at the intermediate diffraction grating 300B is diffracted by the intermediate diffraction grating 300B and its traveling direction is reversed again, so that it travels toward the intermediate diffraction grating 300D, as indicated by a solid line in FIG. 13C. A period at which a light beam thus diffracted intersects the rear surface of the light guide plate 103 is equal to p. This represents that the light beam retains a pixel position in a projected image. A subset of thus diffracted light beams passes through the intermediate diffraction grating 300D and propagates toward the exit diffraction grating 108. Reversing the direction of light beams like this is a feature of the present embodiment.

A description is provided about a permissible margin of surface geometry of the incident, intermediate, and exit diffraction gratings constituting the light guide plate in the present embodiment. On the surface of each diffraction grating, a periodic corrugated pattern is configured. Measuring a diffraction grating with an AFM (Atomic Force Microscope) or an SEM (Scanning Electron Microscope) among others makes it possible to quantify the geometry of a corrugated pattern on the surface with angstrom-level precision. Such measurement apparatus has a field of view on the order of several micrometers (μn) to several tens of micrometers and is capable of measuring a corrugated pattern period in this range. Meanwhile, a diffraction phenomenon is represented by interaction between a diffraction grating and the wavenumber of a light beam when incident light spreads. Assuming that the size of light incident on a light guide plate (approximately equal to the size of an diffraction grating of the light guide plate) is about 5 mm and the pitch of the diffraction grating is 500 nm, it turns out that the light incident on the light guide plate is diffracted by interaction with a corrugation with about 10,000 periods. If there is a random variation in the geometry of the corrugated pattern of the diffraction grating because of various factors, the pitch of the corrugated pattern that is observed by the AFM or SEM can be expressed by an average P and its standard deviation σ. When there is a random variation in the geometry over the 10,000 periods, the wavenumber Keff of the diffraction grating interacting with the incident light is given by Equation 15 below.

[Equation 15]

$$K_{eff} = \frac{2\pi}{(P \pm \sigma / \sqrt{10,000})} \quad (15)$$

Application of this influence to Equation 3, with $k^i$ assumed to denote the wavenumber vector of the incident light and $k^o$ assumed to denote the wavenumber vector of outgoing light, gives an expression as in Equation 16 below.

[Equation 16]

$$k^o = k^i + \left( \frac{2\pi}{(P - \sigma / \sqrt{10,000})} - \frac{2\pi}{(P + \sigma / \sqrt{10,000})} \right) \quad (16)$$

This represents that the difference in an effective wavenumber because of a random variation in the geometry of the diffraction grating changes the wavenumber of outgoing light.

Figure 14:
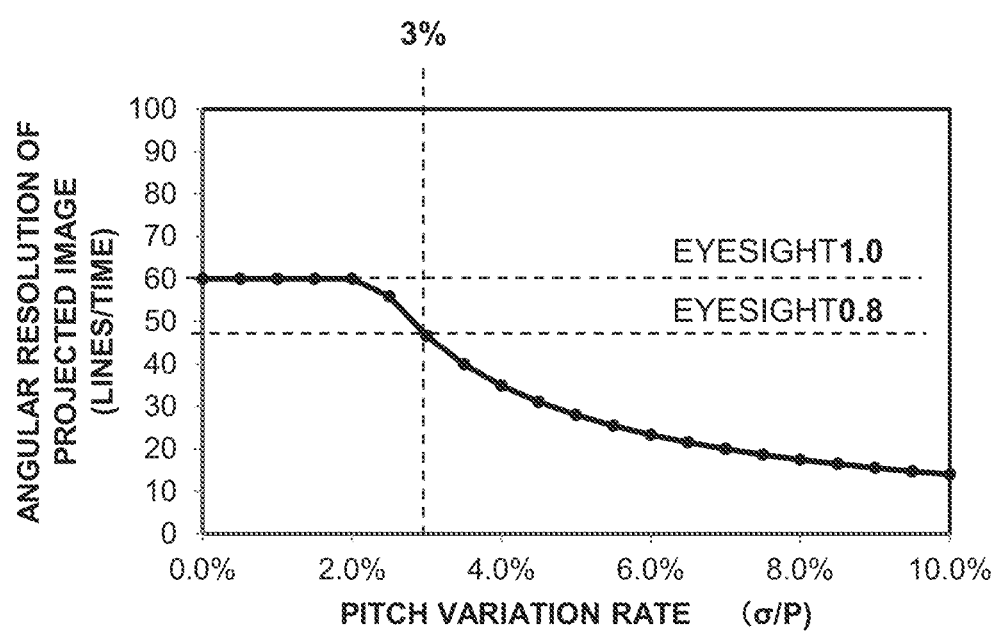
FIG. 14 is a graph showing a calculation result representing a relation between changing in the period of a surface corrugated pattern of a diffraction grating and resolution of a projected image.

FIG. 14 represents a relation between standard deviation of the pitch of the diffraction grating and resolution of a projected image. The abscissa in the drawing indicates a relative pitch variation (σ/P) of the diffraction grating, and the ordinate in the drawing indicates an angle shift of outgoing beams of perpendicularly incident light as angular resolution, which is obtained by Equation 16. Human eyesight is expressed in terms of angular resolution. Here, the eyesight is expressed in units of the number of lines that can be resolved at one time and 60 lines/time are equivalent to eyesight of 1.0. Here, assuming a case where a user whose eyesight is 1.0 views a projected image, a maximum value of angular resolution is set to 60. From the drawing, the wavenumber of outgoing light changes with an increase in the pitch variation of the diffraction grating, and assuming that a decrease in the angular resolution of a projected image to a level equivalent to eyesight of 0.8 is regarded as a criterion, it can be thought that degradation of image quality becomes significant when the pitch variation rate exceeds 3%.

Second Embodiment

FIGS. 15A to 15D are schematic diagrams depicting an overall process of forming a light guide plate in the present embodiment utilizing a mass production process for optical disks. The diagram schematically depicts a process of manufacturing an image display element in the present embodiment. As in step 1 depicted in FIG. 15A, a first step is to prepare a matrix 1501 for incident and intermediate diffraction gratings and a matrix 1502 for exit diffraction grating through an EB (electron beam) drawing process or the like. The matrix 1502 for exit diffraction grating is transferred to a Ni stamper and used for adaptation to an injection molding process.

As in step 2 depicted in FIG. 15B, a next step is to manufacture a substrate 1503, on the surface of which the exit diffraction grating 108 has been formed from a plastic material, using the matrix 1502 for exit diffraction grating. As the plastic material, polycarbonate which is widely used is preferable; however, other transparent resin materials such as PMMA (Poly Methyl Methacrylate) and polyolefin may be used. Then, as required, antireflection coating is formed by a sputtering method or the like to enhance visibility of an outside world.

As in step 3 depicted in FIG. 15C, a step that follows is to apply a UV (ultraviolet) curing resin 1504 in a part of the substrate 1503 formed by injection molding and form the incident diffraction grating 104 and the intermediate diffraction grating 300 through the 2P process, thus making the light guide plate 103. Instead of the 2P process, a nanoimprinting process using a dry sheet as a stamper among others may be used. As required, reflecting coating is applied over the incident diffraction grating 104 by a mask sputtering method or the like to improve the wavelength splitting performance and diffraction efficiency of the incident diffraction grating 104. The process described above makes it possible to form the light guide plate 103 which is made of plastics, less costly, and of light weight.

As in step 34 depicted in FIG. 15D, a final step is to combine light guide plates 103R, 103G, and 103B corresponding to RGB colors, as required, and fix them to a frame 1505, thus completing an optical device 1506.

A commonly used UV curing resin has a refraction index of around 1.5 and there is a small difference from, e.g., the refraction index of 1.58 of polycarbonate. Hence, a phase difference occurring due to an underlying corrugate pattern is small and diffraction is suppressed to ¹⁄₁₀ or less. Nevertheless, if priority is given to image quality, it is preferable that diffraction by the underlying corrugated pattern of the exit diffraction grating 108 is infinitely close to zero. In this case, it is effective to select a UV curing resin 1504 whose reflection index is close to that of the material of the substrate 1503.

A method set forth in the present embodiment is to form the incident diffraction grating 104 and the intermediate diffraction grating 300 on top of a part of a region where the exit diffraction grating 108 is formed. Doing so makes it possible to form the incident diffraction grating 104 and the intermediate diffraction grating 300 in an optional position. An advantage of this method is, for example, that size and shape of the light guide plate 103 can be adjusted depending on the user's need.

Figures 16A, 16B, 16C:
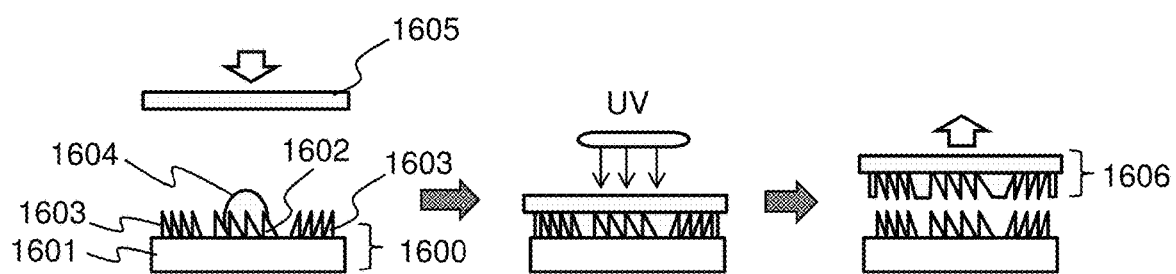
FIGS. 16A-16F are schematic diagrams depicting a process of manufacturing an incident diffraction grating in an embodiment.

FIGS. 16A to 16F are another embodiment depicting a process of manufacturing the light guide plate 103 in the present embodiment. In FIG. 16A, a step is to form corrugated patterns on an Si substrate 1601 or the like using the EB drawing process or the like beforehand and prepare a master (matrix) 1600, on the surface of which an incident diffraction grating pattern 1602 and intermediate diffraction grating patterns 1603 have been formed.

Although a stamper for the 2P process can use the master 1600 directly, a resin stamper may be used to prevent deterioration of the master. Corrugations that are formed on the light guide plate are inverted between a case where the master is directly used and a case where the resin stamper is used. Taking note of this, preparing the master beforehand needs attention.

A method for making a resin stamper is described below. After dropping a UV curing resin 1604 selected, taking account of viscosity, pattern transferability, etc. on the master 1600, the method is to perform in series pressing (FIG. 16A) with a transparent substrate 1605, exposure to UV light (FIG. 16B), and separation (FIG. 16C), thus preparing the resin stamper 1606. As UV exposure equipment that is used here, conveyor type exposure equipment or the like can be selected. To enhance separability of the resin stamper 1606, it is expedient to form a Ti film or the like which is about 30 nm thick on the master 1600 beforehand as a metal release layer.

Although the exit diffraction grating 108 is formed on the surface of a transparent substrate 1503 manufactured by injection molding, a region of the surface where the incident diffraction grating 104 and the intermediate diffraction grating 300 will be formed is left as a planar surface in the present embodiment. As a method other than the planar surface, a method is also effective that forms a corrugated pattern with a pitch that is narrow enough to meet a condition that no diffraction of visible light wavelength occurs and, for example, with a thickness of about 240 nm or less to improve adhesion between the UV resin of the incident diffraction grating 104 and the substrate material. Also, it is easy to render the surface of the transparent substrate 1503 water repellent, oil repellent, and damage preventive beforehand, using $SiO_2$ nanoparticles or the like which are widely used for optical disks.

Figures 16D, 16E:
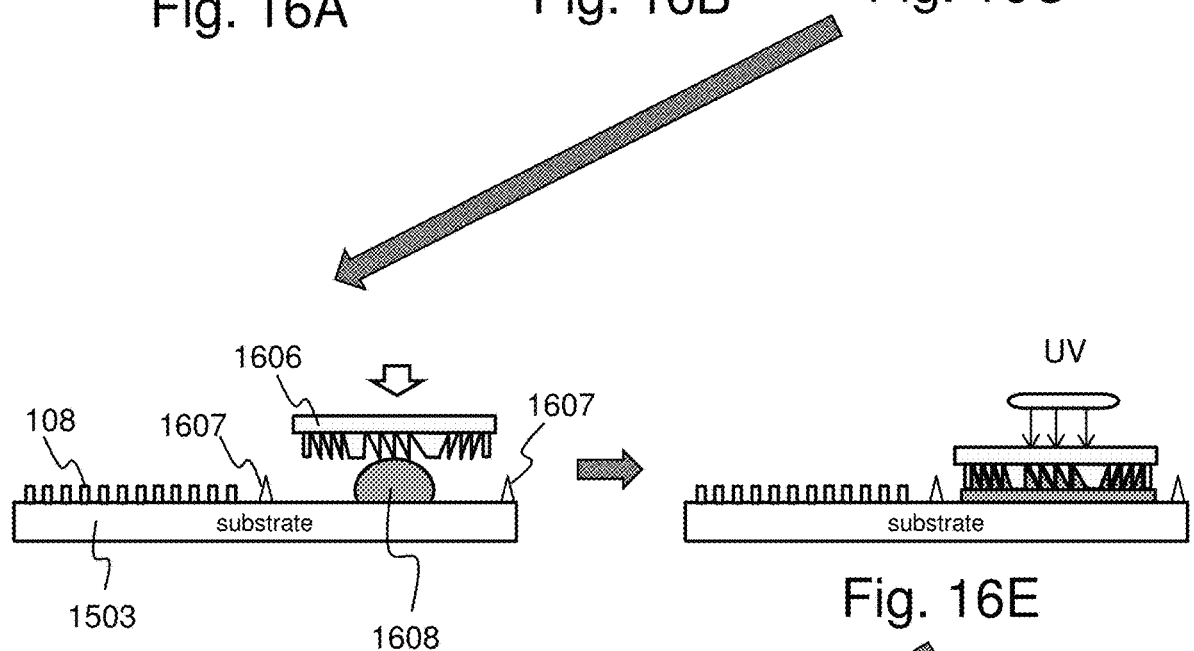
Figure 16F:
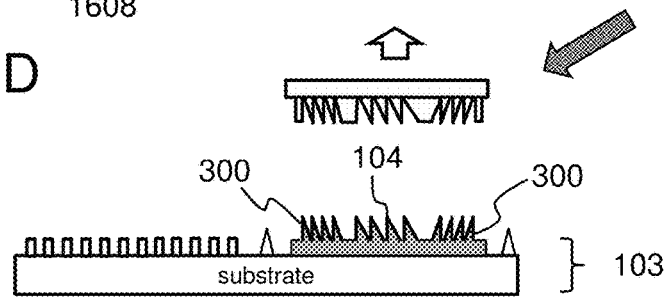

FIG. 16D depicts a process of forming incident and intermediate diffraction gratings on the transparent substrate 1503 on which the exit diffraction grating 108 has been formed beforehand through the injection molding process. On the transparent substrate 1503 on which the exit diffraction grating 108 has been formed, positioning markers 1607 are formed beforehand to define a region where incident and intermediate diffraction gratings are to be formed in portions not affecting optical paths. After dropping the UV curing resin 1608, the process is to position the resin stamper 1606 relative to the markers 1607, perform in series pressing (FIG. 16D), exposure to UV light (FIG. 16E), and separation (FIG. 16F), thus forming the incident diffraction grating 104 and the intermediate diffraction grating 300 and completing the light guide plate 103.

As the UV curing resin 1608 which is used here, a UV curing resin different from the UV curing resin in FIG. 16A may be used, taking the refraction index in addition to separability and transferability into consideration. Because the reflecting coating mentioned previously is formed on top of the corrugated pattern of the incident diffraction grating 104 formed later by the mask sputtering method or the like, the abovementioned markers 1607 are also used in mask positioning for sputtering when forming the reflecting coating.

In the present embodiment, it is possible to define in advance a region where the incident and intermediate diffraction gratings are to be formed. This makes it possible to prevent unnecessary diffraction because of a difference in the refraction index between the transparent substrate 1503 and the UV resin and provides an advantage in which the region where the reflecting coating or the like is to be formed can be defined accurately.

Third Embodiment

Figure 17:
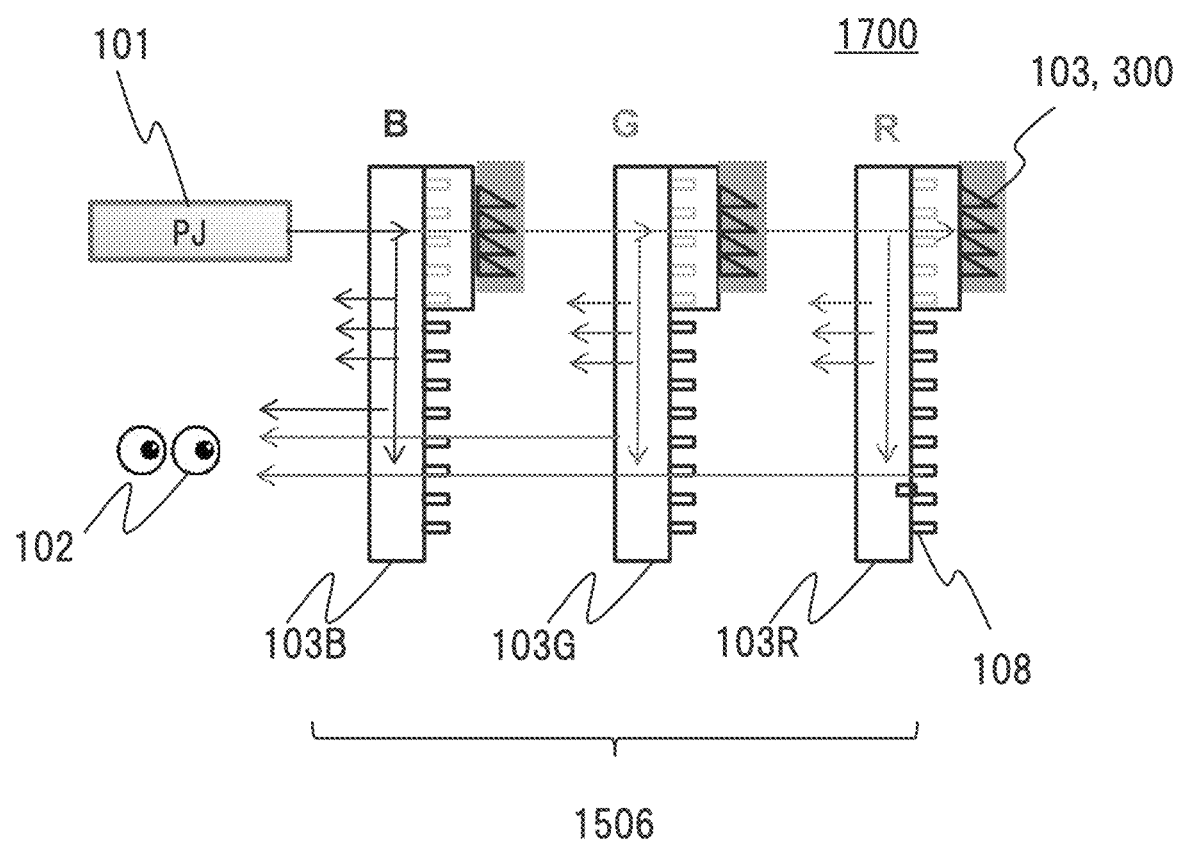
FIG. 17 is a schematic diagram depicting a structure of an image display device in an embodiment.

FIG. 17 depicts a structure of an image display device 1700 in the present embodiment. Light having image information emitted from the projector 101 is directed by action of respective light guide plates 103R, 103G, and 103B for colors B, G, and R to the pupils 102 of a user and realizes augmented reality. The light guide plates 103R, 103G, and 103B for colors B, G, and R are those of the optical device 1506 depicted in FIG. 15D and each diffraction grating that is formed therein has a pitch and depth optimized to fit for each color.

In the drawing, the image display device 1700 is comprised of the optical device 1506, the projector 101 as an image forming unit, and a displayed image controller which is not depicted. Here, the optical device 1506 is an assembly of the light guide plates 103R, 103G, and 103B for colors R, G, and B, respectively, to enable color display. Additionally, as the image forming unit, an image forming device which is widely known may be used, such as, e.g., an image forming device comprised of a spatial light modulator of a reflective type or transmission type, a light source, and lenses, an image forming device with organic and inorganic EL (Electro Luminescence) element arrays and lenses, an image forming device with light emission diode arrays and lenses, and an image forming device with a combination of semiconductor MEMS (Micro Electro Mechanical Systems) mirror arrays and lenses.

Additionally, a device with an LED (Light Emitting Device) or laser light source and a light fiber whose tip is caused to resonate through the use of an MEMS technology and PZT (lead zirconate titanate) may be used. Among the abovementioned devices, one that is used most commonly is the image forming device comprised of a spatial light modulator of a reflective type or transmission type, a light source, and lenses. Here, as the spatial light modulator, typical ones are a liquid crystal display of a reflective type or transmission type, such as LCOS (Liquid Crystal On Silicon), and a digital micro-mirror device (DMD). As the light source, a white light source from which light is separated into RGB components may be used, or LED or laser sources corresponding to the respective colors may be used.

Furthermore, a spatial light modulator of a reflective type may have a structure that is comprised of a liquid crystal display and a polarization beam splitter which reflects and guides a subset of light from the light source to the liquid crystal display and allows transmission of a subset of light reflected by the liquid crystal display and guides it to a collimating optics using lenses. Typical light emitting elements constituting the light source are red, green, blue, and white light emitting elements. The number of pixels should be determined according to specifications required for an image display device. As concrete values of the number of pixels, in addition to 1280×720 mentioned previously, typical examples are 320×240, 432×240, 640×480, 1024×768, and 1920×1080.

In the image display device in the present embodiment, the optical device 1506 is formed in which the light guide plates 103B, 103G, and 103R are positioned and assembled so that light beams containing image information emitted from the projector 101 are irradiated on the respective incident diffraction gratings of the light guide plates.

In addition, the displayed image controller which is not depicted serves a function of controlling operation of the projector 101 to appropriately provide image information to the pupils 102 of a user. Although the present embodiment has been described for the case of providing image information to a user, the image display device in the present embodiment may additionally be equipped with various sensors such as a touch sensor, a temperature sensor, and an acceleration sensor and an eye tracking mechanism for making measurement of the user's eye movement in order to acquire information on the user and an outside world.

Figure 18:
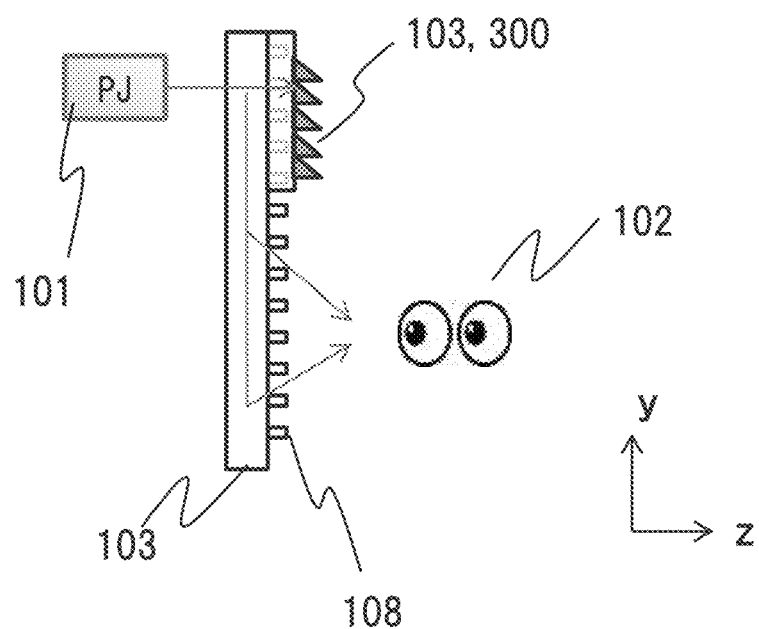
FIG. 18 is a schematic diagram depicting another structure of an image display device in an embodiment.

FIG. 18 is another schematic diagram depicting an image display device structure in the present embodiment. In comparison with FIG. 17, a positional relation between the projector 101 and the user's pupils 102 is reverse to the positional relation in FIG. 17 with respect to the light guide plate 103. This influence can be nullified by inverting a projected image. Other details of operation are the same as described hereinbefore.

According to the embodiments described hereinbefore, in a light guide plate (image display element) having corrugated type diffraction gratings, an intermediate diffraction grating is provided between an incident diffraction grating and an exit diffraction grating, and light beams having image information are diffracted twice or more within the intermediate diffraction grating, thereby making it possible to improve brightness of an image to be visualized and reduce uneven brightness.

What is claimed is:

1. A light guide plate comprising:
    an incident diffraction grating which diffracts incident imaging light;
    an exit diffraction grating through which the imaging light goes out; and
    an intermediate diffraction grating existing in optical paths from the incident diffraction grating to the exit diffraction grating,
    wherein a periodic linear corrugated pattern is formed as the incident diffraction grating,
    wherein, when an imaginary line is established that passes through an incident point of the imaging light onto the incident diffraction grating and is parallel with a periodic direction of the corrugated pattern, the intermediate diffraction grating has a first region on one side of the imaginary line and a second region on the other side of the imaginary line and reflects at least a subset of the imaging light at least once in each of the first region and the second region, and
    wherein the intermediate diffraction grating reflects the light toward the incident diffraction grating in the first region to make the light enter the second region and reflects the light toward the exit diffraction grating in the second region.

2. The light guide plate according to claim 1, wherein the intermediate diffraction grating makes a parallel displacement of the imaging light having entered the first region in a direction perpendicular to the imaginary line thereby making the light go out from the second region.

3. The light guide plate according to claim 1, wherein a pattern period of the intermediate diffraction grating is smaller than a pattern period of the incident diffraction grating.

4. The light guide plate according to claim 3, wherein a normalized pitch of the intermediate diffraction grating falls within a range between 0.45 and 0.65, inclusive.

5. The light guide plate according to claim 1, wherein an acute angle θm of a pattern direction of the intermediate grating with respect to the pattern direction of the incident diffraction grating falls within a range between 45° and 85°, inclusive.

6. The light guide plate according to claim 1, wherein the intermediate diffraction grating has a structure that is line-symmetric with respect to the imaginary line.

7. The light guide plate according to claim 1, wherein the exit diffraction grating is formed to have corrugations on a substrate and the incident diffraction grating and the intermediate diffraction grating are formed with an ultraviolet curing resin on top of the thus formed exit diffraction grating.

8. The light guide plate according to claim 1, wherein the exit diffraction grating is formed to have corrugations on the substrate and the incident diffraction grating and the intermediate diffraction grating are formed with the ultraviolet curing resin in a substrate surface region where the exit diffraction grating is not formed.

9. An image display device comprising:
    a projector to emit imaging light; and
    a light guide plate,
    wherein the light guide plate includes:
    an incident diffraction grating which diffracts incident imaging light from the projector;
    an exit diffraction grating through which the imaging light goes out; and
    an intermediate diffraction grating existing in optical paths from the incident diffraction grating to the exit diffraction grating,
    wherein a periodic linear corrugated pattern is formed as the incident diffraction grating,
    wherein, when an imaginary line is established that passes through an incident point of the imaging light onto the incident diffraction grating and is parallel with a periodic direction of the corrugated pattern, the intermediate diffraction grating has a first region on one side of the imaginary line and a second region on the other side of the imaginary line and reflects at least a subset of the imaging light at least once in each of the first region and the second region, and
    wherein the intermediate diffraction grating reflects the light toward the incident diffraction grating in the first region to make the light enter the second region and reflects the light toward the exit diffraction grating in the second region.

10. The light guide plate according to claim 1, wherein a diffraction mirror which reflects at least a subset of the imaging light toward the exit diffraction grating is placed in optical paths from the intermediate diffraction grating to the exit diffraction grating.

* * * * *